US012775938B2

(12) United States Patent
Hayhow et al.

(10) Patent No.: US 12,775,938 B2
(45) Date of Patent: Oct. 27, 2026

(54) METHOD AND NETWORK FOR CONFIGURING A COMMUNICATIONS TERMINAL

(71) Applicant: The Toronto-Dominion Bank, Toronto (CA)

(72) Inventors: Robert Hayhow, Burlington (CA); Bryan Michael Gleeson, Toronto (CA)

(73) Assignee: THE TORONTO-DOMINION BANK, Toronto (CA)

(*) Notice: Subject to any disclaimer, the term of this patent is extended or adjusted under 35 U.S.C. 154(b) by 1366 days.

(21) Appl. No.: 17/114,966

(22) Filed: Dec. 8, 2020

(65) Prior Publication Data

US 2021/0192510 A1 Jun. 24, 2021

Related U.S. Application Data

(63) Continuation of application No. 14/340,417, filed on Jul. 24, 2014, now Pat. No. 10,891,611, which is a (Continued)

(51) Int. Cl.

*G06Q 20/38* (2012.01)
*G06Q 20/02* (2012.01)

(Continued)

(52) U.S. Cl.

CPC ..... *G06Q 20/38215* (2013.01); *G06Q 20/027* (2013.01); *G06Q 20/20* (2013.01);

(Continued)

(58) Field of Classification Search

CPC .... G06Q 20/02; G06Q 20/3821–38215; H04L 9/3263–3268

See application file for complete search history.

(56) References Cited

U.S. PATENT DOCUMENTS

| | | | |
|---|---|---|---|
| 5,883,810 | A | 3/1999 | Franklin et al. |
| 6,035,402 | A | 3/2000 | Vaeth et al. |

(Continued)

FOREIGN PATENT DOCUMENTS

| | | | |
|---|---|---|---|
| WO | 20120002810 | A1 | 1/2012 |
| WO | 2012095670 | A1 | 7/2012 |

OTHER PUBLICATIONS

"Cluster Analysis", retrieved from https://en.wikipedia.org/wiki/Cluster_analysis (40 pages).

(Continued)

*Primary Examiner* — Jay Huang
(74) *Attorney, Agent, or Firm* — NIXON PEABODY LLP

(57) ABSTRACT

A terminal configuration network includes a communications terminal and a certificate server. The certificate server is configured to receive, from the communications terminal, an activation request that includes at least one credential. The certificate server is configured to confirm that the credential was uniquely associated with the terminal in a database before the server received the activation request. The certificate server is also configured to generate an activation response that includes a digital certificate, and to transmit the response to the terminal. The terminal communications is configured to establish an encrypted channel with a computer server using the digital certificate, and to download a payload to the terminal via the encrypted channel. The computer server is distinct from the certificate server.

14 Claims, 11 Drawing Sheets

Related U.S. Application Data continuation of application No. 14/137,910, filed on Dec. 20, 2013, now abandoned, which is a continuation of application No. 13/850,234, filed on Mar. 25, 2013, now Pat. No. 8,621,595.

(60) Provisional application No. 61/615,168, filed on Mar. 23, 2012.

(51) Int. Cl.
*G06Q 20/20* (2012.01)
*G06Q 20/34* (2012.01)

(52) U.S. Cl.
CPC ....... *G06Q 20/341* (2013.01); *G06Q 20/3821* (2013.01); *G06Q 20/3829* (2013.01)

(56) References Cited

U.S. PATENT DOCUMENTS

| | | | | |
|---|---|---|---|---|
| 6,170,058 | B1 * | 1/2001 | Kausik | G07F 7/1008 713/193 |
| 6,192,131 | B1 | 2/2001 | Geer et al. | |
| 6,327,578 | B1 | 12/2001 | Linehan | |
| 6,587,563 | B1 | 7/2003 | Crandall | |
| 6,925,182 | B1 | 8/2005 | Epstein | |
| 7,117,363 | B2 | 10/2006 | Lincoln et al. | |
| 7,237,717 | B1 | 7/2007 | Rao et al. | |
| 7,336,905 | B2 | 2/2008 | Pyo et al. | |
| 7,707,120 | B2 | 4/2010 | Domínguez et al. | |
| 7,831,519 | B2 | 11/2010 | Kean | |
| 7,882,635 | B2 | 2/2011 | Wakayama et al. | |
| 8,041,338 | B2 | 10/2011 | Chen et al. | |
| 8,205,240 | B2 | 6/2012 | Ansari et al. | |
| 8,286,865 | B2 | 10/2012 | Wilson | |
| 8,386,776 | B2 | 2/2013 | Gomi et al. | |
| 8,769,291 | B2 | 7/2014 | Schneider | |
| 8,831,189 | B2 | 9/2014 | Maximo et al. | |
| 8,856,514 | B2 | 10/2014 | Dixon | |
| 9,754,253 | B1 * | 9/2017 | Brandwine | G06Q 20/382 |
| 2001/0034834 | A1 | 10/2001 | Matsuyama et al. | |
| 2002/0095588 | A1 | 7/2002 | Shigematsu et al. | |
| 2002/0112171 | A1 * | 8/2002 | Ginter | H04N 21/6581 375/E7.009 |
| 2003/0177361 | A1 * | 9/2003 | Wheeler | G06Q 20/00 713/176 |
| 2004/0127277 | A1 | 7/2004 | Walker et al. | |
| 2005/0005098 | A1 | 1/2005 | Michaelis et al. | |
| 2006/0059342 | A1 | 3/2006 | Medvinsky et al. | |
| 2006/0059346 | A1 | 3/2006 | Sherman et al. | |
| 2006/0153364 | A1 | 7/2006 | Beeson | |
| 2006/0181515 | A1 | 8/2006 | Fletcher et al. | |
| 2008/0162357 | A1 * | 7/2008 | Gerardi | E21B 34/16 705/56 |
| 2008/0201575 | A1 | 8/2008 | van der Rijn | |
| 2009/0113533 | A1 | 4/2009 | Genty et al. | |
| 2009/0204545 | A1 | 8/2009 | Barsukov | |
| 2010/0144350 | A1 | 6/2010 | Walter et al. | |
| 2010/0267578 | A1 | 10/2010 | Shukla et al. | |
| 2011/0126264 | A1 | 5/2011 | Dunstan | |
| 2011/0173678 | A1 | 7/2011 | Kaippallimali et al. | |
| 2011/0276495 | A1 | 11/2011 | Varadarajan et al. | |
| 2012/0290416 | A1 | 11/2012 | Luevane et al. | |
| 2013/0054417 | A1 * | 2/2013 | O'Donoghue | G06Q 20/02 705/26.1 |

OTHER PUBLICATIONS

"Transport Layer Security", retrieved from https://en.wikipedia.org/wiki/Trasport_Layer_Security (123 pages).
"X.509," retrieved from "en.wikipedia.org/wiki/X.509" on Jul. 16, 2025 (19 pages).
"Certificate signing request," retrieved from "en.wikipedia.org/wiki/Certificate_signing_request" on Jul. 16, 2025 (4 pages).
Position of Adverbs, published at perfectyourenglish.com/grammar/adverbs-position.htm (2 pages).
Chain of Trust, published by Wikipedia at en.wikipedia.org/wiki/Chain_of_trust (3 pages).

* cited by examiner

FIG. 3
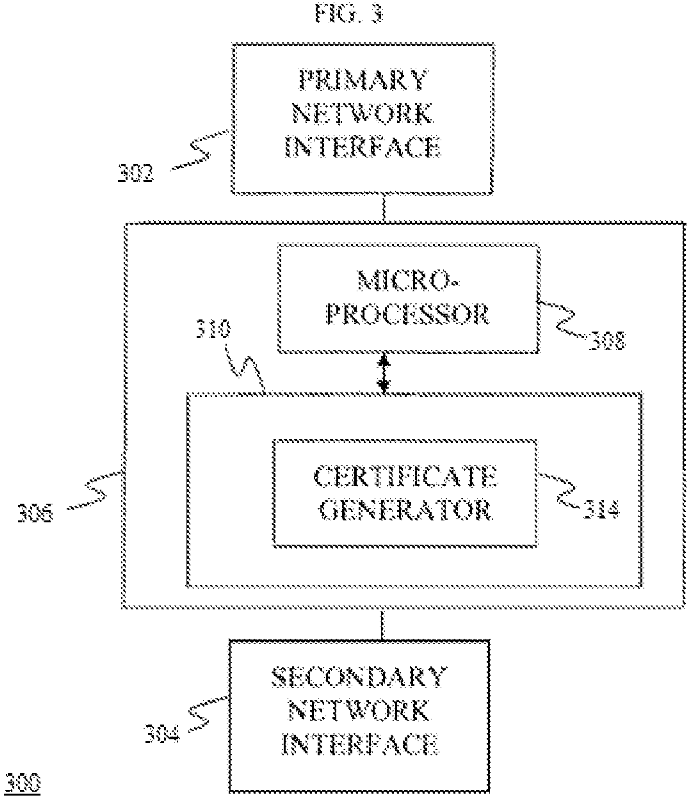
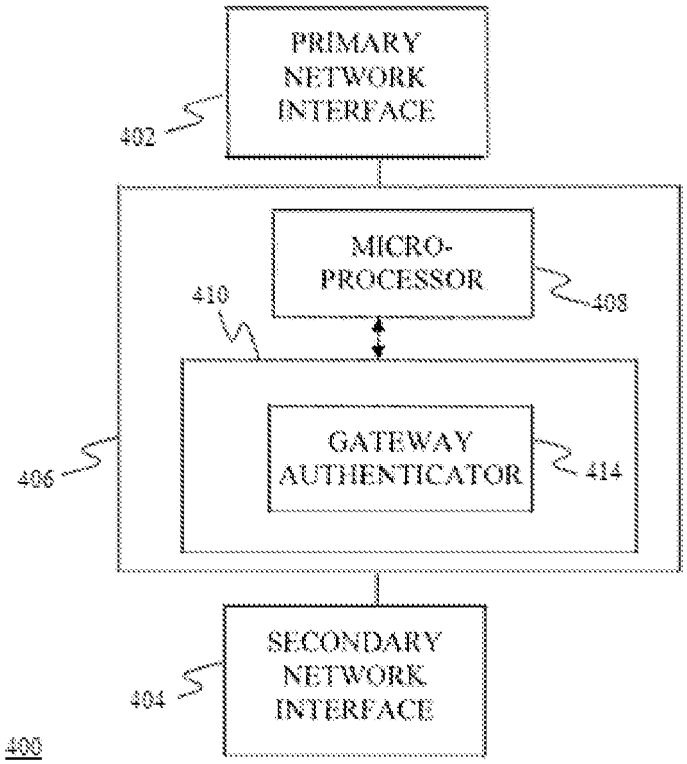
FIG. 4

METHOD AND NETWORK FOR CONFIGURING A COMMUNICATIONS TERMINAL

RELATED APPLICATIONS

This patent application is a continuation of U.S. patent application Ser. No. 14/340,417, filed Jul. 24, 2014, entitled "System and Method for Authenticating a Payment Terminal", which is a continuation of U.S. patent application Ser. No. 14/137,910, filed Dec. 20, 2013, entitled "System and Method for Authenticating a Network Gateway", which is a continuation of U.S. patent application Ser. No. 13/850,234, filed Mar. 25, 2013, entitled "System and Method for Authenticating a Network Gateway" (now U.S. Pat. No. 8,621,595), which claims the benefit of the filing date of provisional U.S. patent application No. 61/615,168, filed Mar. 23, 2012, entitled "System and Method for Authenticating a Payment Terminal," each of which are hereby incorporated by reference in their entirety for all purposes.

FIELD

This patent application relates to methods and networks for terminal configuration.

BACKGROUND

Many merchants provide electronic payment terminals to allow customers to purchase goods and services by means other than cash payment. The payment terminals are connected to a secure payment (acquirer) network which interfaces with the merchants' respective financial institutions. The payment terminals are deployed with proprietary software that uses the acquirer network to securely process electronic payments via payment account information received from hardware tokens (e.g. credit cards, debit cards) that may be interfaced with the payment terminals.

Merchants often locate inexpensive wares in close proximity to checkout lanes to increase the likelihood of impulse purchases. Dunstan (WO 2010/012094) expands upon this idea by using a central computer server as a trusted intermediary between the acquirer network and a second network to allow customers to use the payment terminals to access computer servers on the second network. The central server allows the computer servers of the second network to apply their security services on the acquirer network. The acquirer terminals are provided with a terminal application that supplements or replaces the existing proprietary software deployed on the acquirer terminals. The terminal applications allow the acquirer terminals to be used on the second network via the security services imposed by the central server. However, since the central server is controlled by a third party, and the terminal applications communicate with the acquirer network and the central server, the security of the acquirer network can become compromised by rogue software installed on the central server.

SUMMARY

By way of overview, in a first aspect this disclosure relates to a terminal configuration network that includes a communications terminal and a certificate server. The communications terminal is configured to generate an activation request. The activation request includes at least one terminal credential.

The certificate server is configured to receive the activation request from the communications terminal. The certificate server is also configured to validate the activation request, by confirming that the at least one terminal credential was uniquely associated with the communications terminal in a database before the certificate server received the activation request. The database may be remote from the communications terminal.

The certificate server is also configured to generate an activation response in response to the activation request, and to transmit the activation response to the communications terminal. The activation response includes a digital certificate.

The communications terminal is also configured to establish an encrypted channel with a computer server using the digital certificate, and to download a payload to the communications terminal via the encrypted channel. The computer server is distinct from the certificate server.

In a second aspect, this disclosure relates to a method of configuring a communications terminal. The method of the second aspect of this disclosure involves the communications terminal generating an activation request, and transmitting the activation request to a certificate server. The activation request includes at least one terminal credential.

In accordance with this method, the certificate server then validates the activation request, by confirming that the at least one terminal credential was uniquely associated with the communications terminal in a database before the certificate server received the activation request. The database may be remote from the communications terminal. The certificate server generates an activation response in response to the activation request, and transmits the activation response to the communications terminal. The activation response includes a digital certificate.

In accordance with this method, the communications terminal then establishes an encrypted channel with a computer server using the digital certificate, and downloads a payload to the communications terminal via the encrypted channel. The computer server is distinct from the certificate server.

In a third aspect, this disclosure relates to a certificate server that facilitates configuring a communications terminal. The certificate server includes a memory, and a processor that is in communication with the memory. The memory stores computer processing instructions which, when executed by the processor, cause the processor to receive an activation request from a communications terminal, and validate the activation request. The activation request includes at least one terminal credential.

The processing instructions, when executed by the processor, cause the processor to validate the activation request, by confirming that the at least one terminal credential was uniquely associated with the communications terminal in a database before the certificate server received the activation request. The database may be remote from the communications terminal. The processing instructions, when executed by the processor, cause the processor to generate an activation response in response to the activation request, and to transmit the activation response to the communications terminal. The activation response includes a digital certificate.

In one implementation, the communications terminal includes a user input device and a non-volatile memory. The non-volatile memory may store one of the at least one terminal credentials. In this implementation, the communications terminal is configured to receive another of the at least one terminal credentials via the user input device, and incorporate the one terminal credential and the another terminal credential into the activation request. The certificate server is configured to validate the activation request by confirming that the one terminal credential was saved uniquely in association with the another terminal credential in the database before the certificate server received the activation request.

The communications terminal may be configured to sign the activation request with a private cryptographic key, and the certificate server may be configured to validate the activation request by confirming that the activation request was signed with the private cryptographic key.

The communications terminal may be configured to receive the private cryptographic key via the user input device, generate a public cryptographic key from the private cryptographic key, and incorporate the public cryptographic key into the activation request. The certificate server may be configured to use the public cryptographic key to confirm that the activation request was signed with the private cryptographic key. The public cryptographic key and the private cryptographic key are an asymmetric cryptographic key pair.

In one implementation, the digital certificate includes an expiry date, and the communications terminal is configured to determine, from the expiry date, that the digital certificate has expired, renew the (expired) digital certificate, and establish the encrypted channel using the renewed digital certificate.

The digital certificate may include a network address, and the communications terminal may be configured to renew the digital certificate by generating a renewal request, and transmitting the renewal request to the network address. The renewal request includes the at least one terminal credential.

In one implementation, the computer server is configured to associate an administrator credential with the communications terminal, receive from the communications terminal an authentication request that includes the administrator credential, confirm that the computer server had associated the administrator credential with the communications terminal before the computer server received the authentication request, and transmit the payload to the communications terminal after the computer server confirms the authentication request.

BRIEF DESCRIPTION OF THE DRAWINGS

The foregoing aspects of this disclosure will now be described, by way of example, with reference to the accompanying drawings, in which:

FIG. 3 is a schematic view of the certificate server of the authentication network;

FIG. 4 is a schematic view of the network gateway of the authentication network;

DETAILED DESCRIPTION

Authentication Network

Overview

Figure 1:
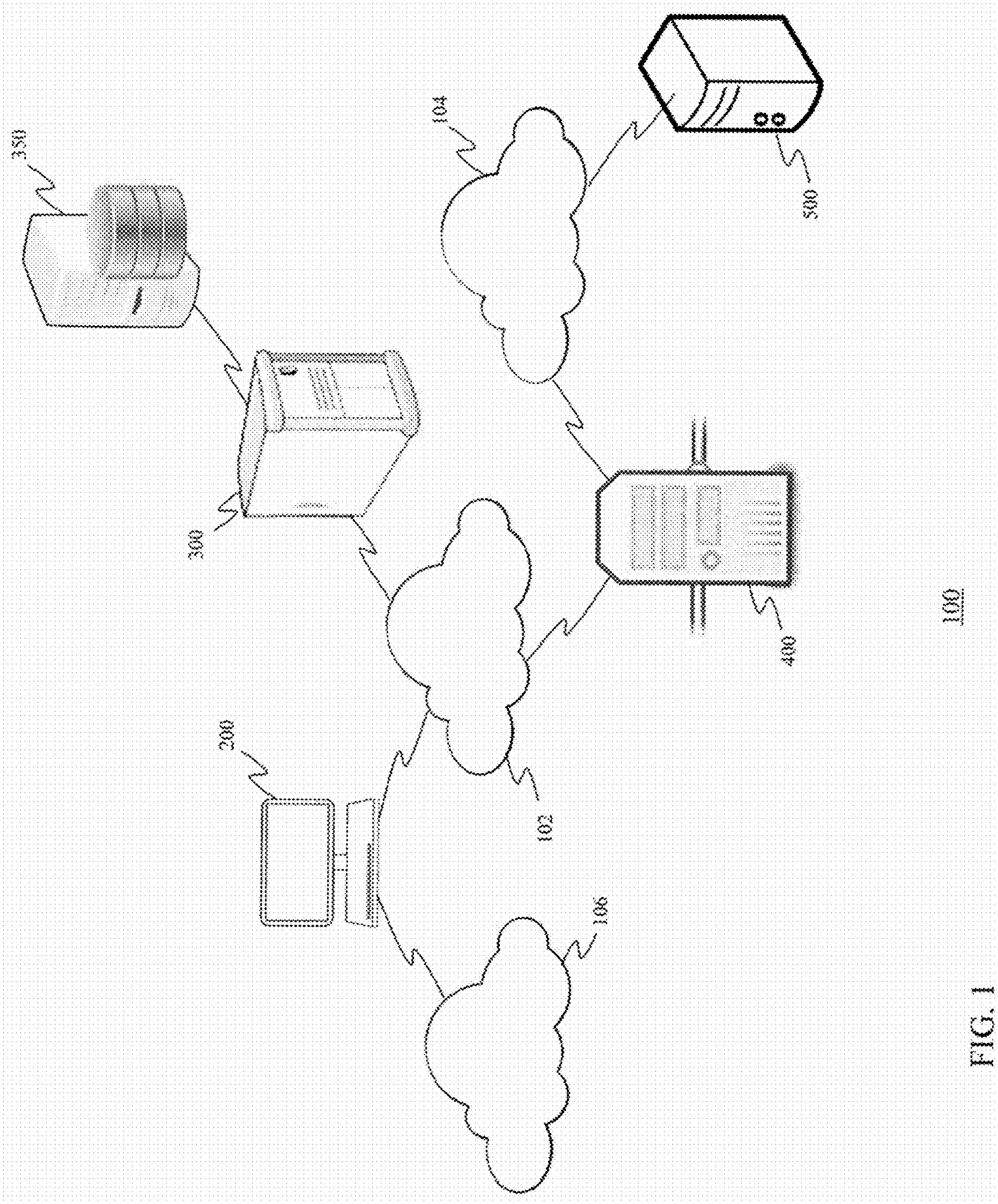
FIG. 1 is a block diagram that illustrates the various components of the authentication network.

Turning to FIG. 1, there is shown an authentication network, denoted generally by reference number 100, that includes a communications terminal 200 and a network gateway 400. Preferably, the authentication network 100 also includes a certificate server 300 and a terminal management server 350. Although the authentication network 100 is shown comprising only a single communications terminal 200, typically the authentication network 100 includes a plurality of the communications terminals 200.

Similarly, although the authentication network 100 is shown comprising only a single certificate server 300 and a single network gateway 400, the authentication network 100 may include a plurality of certificate servers 300 and/or a plurality of the network gateways 400. Further, although the network gateway 400 is depicted as a monolithic network component, the functionality of the network gateway 400 may be split amongst multiple network components or servers.

The communications terminal 200 typically comprises a wireless or wired communications device, such as a personal or tablet computer, a mobile phone, a smartphone or a personal digital assistant (PDA). Preferably, however, the communications device is implemented as a payment terminal and is configured to interface with an identity token 210 and/or to an electronic cash register (ECR). As non-limiting examples, the payment terminal may comprise an integrated point-of-sale (POS) terminal, or a pin-pad terminal that communicates with a POS terminal. Alternately, the payment terminal may comprise an automated teller machine (ATM), or automated banking machine (ABM). The communications terminal 200 and the identity token 210 will be discussed in further detail below.

The certificate server 300 may be implemented on one or more computer servers, and is configured to communicate with the communications terminal(s) 200 via a first communications network 102. Typically, the first communications network 102 comprises a wireline or wireless packet-switched (e.g. internet protocol or "IP", 3G, 4G) or circuit-switched network (e.g. public switched telephone network or "PSTN"). The certificate server 300 is also configured to facilitate authentication of the communications terminal(s) 200 to the network gateway 400, by issuing terminal authentication certificates to the communications terminals 200.

The terminal management server 350 may include a database of records, each associated with a respective communications terminal 200. As will be discussed below, the certificate server 300 may make use of the terminal management server 350 to validate the communications terminals 200.

The network gateway 400 may be implemented on one or more computer servers, and is configured to communicate with the communications terminal(s) 200 via the first communications network 102 and to authenticate the communications terminal(s) 200. Preferably, the network gateway 400 is separate and distinct from the certificate server 300. If the authentication network 100 includes a plurality of the network gateways 400, each network gateway 400 may communicate with a respective portion of the communications terminal(s) 200 via a respective first communications network 102.

As will be explained in further detail below, the network gateway 400 is also configured to authenticate itself to a second communications network 104, that is distinct from the first communications network 104, and thereby allow users of the communications terminals 200 to complete online transactions with network devices 500 of the second communications network 104. Typically, the second communications network 102 comprises a packet-switched network, and the network device 500 comprises a computer server.

One of more of the communications terminals 200 also be configured to communicate with a secure payment network 106, that is distinct from the communications networks 102, 104, to thereby effect payment for the online transaction. As non-limiting examples, the secure payment network 106 may comprise VisaNet, the Mastercard Network, and/or the merchant's payment card acquirer network.

As used herein, an "online transaction" is any e-commerce or other electronic transaction (e.g. purchase of goods/services, bill payment, funds transfer, bank account or credit card balance query) that is provided by a network device. In a preferred implementation, the communications terminal 200 is a payment terminal, the network device is a computer server, and the online transaction involves using the payment terminal to purchase lottery tickets from the computer server. It should be understood, however, that the invention described herein is not so limited to this particular implementation.

Communications Terminal/Identity Token

Figure 2:
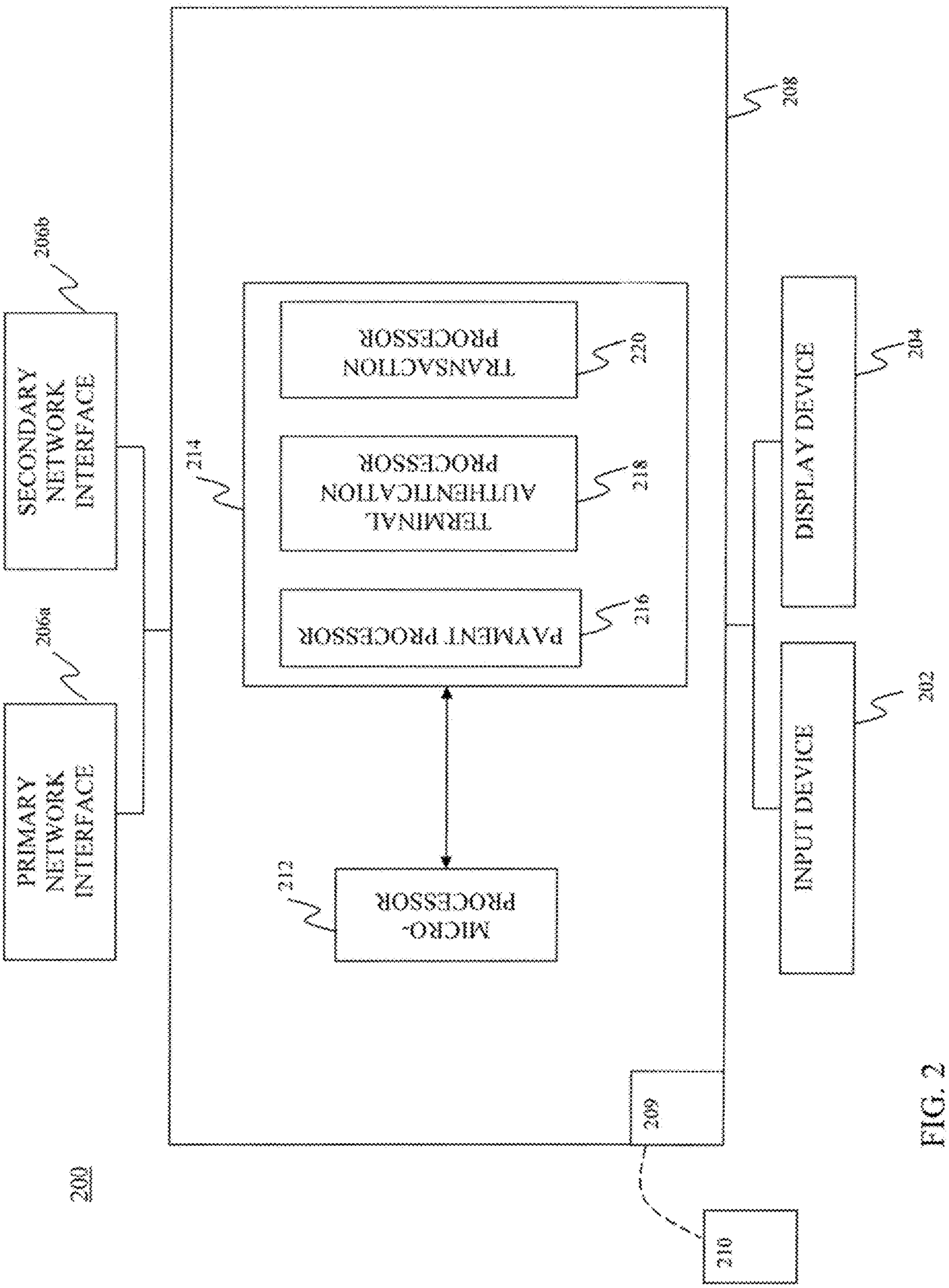
FIG. 2 is a schematic view of the communications terminal of the authentication network.

As mentioned, the communications terminal 200 is typically implemented as a wireless or wired payment terminal. As shown in FIG. 2, the communications terminal 200 includes a user interface/input device 202, a display device 204, a first network interface 206*a*, a second network interface 206*b*, and a computer processing unit 208 that is coupled to the input device 202, the display device 204 and the network interfaces 206*a*, 206*b*. Preferably, the input device 202, the display device 204, the network interfaces 206*a*, 206*b* and the computer processing unit 208 are integrated together within a common housing. The communications terminal 200 may also include a contact/contactless token interface 209 that is coupled to the computer processing unit 208 and is configured to communicate with the identity token 210.

The input device 202 may be implemented as a keyboard, touchpad, and/or touchscreen and/or other input device suitable for allowing an operator of the communications terminal 200 to input data and/or commands into the communications terminal 200. The display device 204 may comprise a liquid crystal display (LCD) panel, cathode ray tube (CRT) display, plasma display panel, and/or paper printer and/or other output device suitable for displaying information to the operator of the communications terminal 200.

The first network interface 206*a* interfaces the communications terminal 200 with the first communications network 102. The second network interface 206*b* interfaces the communications terminal 200 with the secure payment network 106.

The computer processing unit 208 may include a microprocessor 212 and computer-readable medium 214. The computer-readable medium 214 may be provided as electronic computer memory (e.g. FLASH memory) that may store one or more credentials ("terminal credentials") that can be used to identify and are uniquely associated with the communications terminal 200. As non-limiting examples, the terminal credentials may comprise a terminal identifier (terminal ID) and/or a serial number of the communications terminal 200. The memory 214 may also store computer processing instructions stored thereon which, when executed by the microprocessor 212, define an operating system (not shown) that allows the communications terminal 200 to accept user input from the input device 202 and to control the display device 204 and the token interface 209. Preferably, the computer processing instructions also define a payment processor 216 which allows the operator of the communications terminal 200 to use the payment network 106 to pay for a transaction.

The identity token 210 typically comprises a self-contained integrated circuit device that includes a built-in micro-controller and protected memory. The micro-controller and protected memory together provide a secure self-contained computing environment for running cryptographic (e.g. data encryption standard (DES), triple-DES, advanced encryption standard (AES)) algorithms.

The identity token 210 may have a contactless (e.g. NFC and/or ISO 14443 based) form factor, and may communicate with the communications terminal 200 via a wireless protocol, such as ISO 14443. For example, the identity token 210 may be implemented as a contactless smartcard or integrated circuit card (e.g. credit card, debit card) or within a wireless telephone or wireless data messaging device, and the token interface 209 may be configured to communicate with the identity token 210 using near-field communication or Bluetooth. Alternately, the identity token 210 may have a contact form factor, and may interface directly with the communications terminal 200. For example, the identity token 210 may be implemented as a contact-style smartcard or integrated circuit card (e.g. credit card, debit card). The token interface 209 may be configured to communicate with the identity token 210 via a physical port (e.g. card reader) of the communications terminal 200.

Typically, the protected memory of the identity token 210 is configured with a cryptographic key ("token cryptographic key") and one or more credentials ("administrator credentials") that were uniquely assigned to the intended recipient of the identity token 210 by the issuer of the identity token 210. As non-limiting examples, the administrator credentials may comprise an administrator identifier ("sysID") and/or an administrator passcode. The administrator credentials and token cryptographic key may be stored in the protected memory at the time the identity token 210 is manufactured or prior to delivery of the identity token 210 to the intended individual.

Preferably, the administrator credentials and the stored token cryptographic key are uniquely associated with the identity token 210. Further, typically the stored token cryptographic key is a private cryptographic key that is not publicly available, but is either known or can be re-generated only by the issuer of the identity token 210. As will be discussed below, the identity token 210 may use the administrator sysID and the token cryptographic key in the cryptographic algorithms to generate cryptograms ("token cryptograms") that are used by the second communications network 104 to authenticate the communications terminal 200 to the second communications network 104.

The computer processing instructions of the memory 214 may define a terminal authentication processor 218 that allows the communications terminal 200 to authenticate to the network gateway 400, and a transaction processor 220 that allows the communications terminal 200 to complete a transaction with a network device 500 of the second communications network 104. Although the terminal authentication processor 218 and the transaction processor 220 may be implemented as computer processing instructions, all or a portion of the functionality of the terminal authentication processor 218 and the transaction processor 220 may be implemented instead in electronics hardware.

The terminal authentication processor 218 is configured to generate a terminal activation request from a private encryption key (activation code) and from at least one of the terminal credentials (e.g. terminal ID, terminal serial number) that are uniquely associated with the communications terminal 200. As will be discussed below, the administrator of the communications terminal 200 may manually input the private encryption key (activation code) into the communications terminal 200 via the input device 202. Alternately, the activation code may be stored on an identity token (e.g. identity token 210), and the administrator may input the activation code into the communications terminal 200 by interfacing the identity token with the communications terminal 200.

The terminal activation request includes a public encryption key. Preferably, the public encryption key and the activation code comprise an asymmetric encryption key pair. The terminal authentication processor 218 may implement a cryptographic (e.g. data encryption standard (DES), triple-DES, advanced encryption standard (AES)) algorithm, and may generate the public encryption key from the activation code. Preferably, the terminal activation request also includes at least one of the terminal credentials, and the terminal authentication processor 218 uses the activation code and the cryptographic algorithm to digitally-sign the terminal activation request.

The terminal authentication processor 218 is configured to transmit the terminal activation request to the certificate server 300, and to save in the memory 214 an activation response that is received from the certificate server 300 in response to the terminal activation request. The activation response includes a digital terminal authentication certificate. The terminal authentication certificate includes the public encryption key that was included with the terminal activation request. Typically, the terminal authentication certificate is digitally-signed by the certificate server 300.

The terminal authentication processor 218 is configured to authenticate the communications terminal 200 to the certificate server 300 and/or to a computer server, distinct from the certificate server 300, using the saved terminal authentication certificate. In the embodiment described below, the terminal authentication processor 218 uses the terminal authentication certificate to authenticate to the network gateway 400, and may also use the terminal authentication certificate to authenticate to certificate server 300 in order to renew the terminal authentication certificate. However, it should be understood that the terminal authentication certificate may be used to authenticate the communications terminal 200 to any network device that is accessible, directly or indirectly, to the communications terminal 200.

The transaction processor 220 is configured to generate a transaction proposal from one or more of the administrator credentials (e.g. sysID, administrator passcode), and to transmit the transaction proposal to the network gateway 400, via the first network interface 206*a*. The transaction proposal identifies a proposed transaction that the operator of the communications terminal 200 proposes to engage in with a network device 500 of the second communications network 104. Accordingly, the transaction proposal may also include payment particulars for the proposed transaction or include one or more predefined transaction identifiers which the network gateway 400 can use to calculate or otherwise determine the payment particulars.

The transaction processor 220 is configured to receive from the network gateway 400 a transaction proposal response that is issued in response to the transaction proposal. The transaction proposal response specifies a pointer to the proposed transaction. As will be explained below, the network gateway 400 may generate the transaction pointer from the administrator credentials, payment particulars and/or transaction identifiers (if any) that were included in the transaction proposal. Alternately, or additionally, the transaction pointer may comprise a pseudo-random number generated by the network gateway 400. The transaction proposal response may also identify the payment particulars for the proposed transaction. Preferably, the transaction processor 220 saves the transaction proposal response in the memory 214.

The transaction processor 220 may also be configured to transmit over the payment network 106, via the second network interface 206*b*, payment particulars for effecting payment for the proposed transaction, and to receive from the payment network 106 a payment confirmation in response to the payment particulars. After payment for the proposed transaction is confirmed, the transaction processor 220 generates a transaction request from the administrator credential and the transaction pointer, and transmit the transaction request to the network client via the first network interface 206*a* and the network gateway 400. The transaction request requests completion of the proposed transaction with the network device 500.

Certificate Server/Terminal Management Server

The certificate server 300 is implemented as one or more networked computer servers. As shown in FIG. 3, the certificate server 300 includes a primary network interface 302, a secondary network interface 304, and a computer processing unit 306 that is coupled to the primary network interface 302 and the secondary network interface 304. The primary network interface 302 interfaces the certificate server 300 with the first communications network 102 and allows the certificate server 300 to communicate with the communications terminals 200. The secondary network interface 304 interfaces the certificate server 300 with the terminal management server 350.

The computer processing unit 306 of the certificate server 300 may include a microprocessor 308 and a computer-readable medium 310. The computer-readable medium 310 may be provided as electronic computer memory (e.g. flash memory) or optical or magnetic memory (e.g. compact disc, hard disk) and may include computer processing instructions stored thereon which, when executed by the microprocessor 308, define an operating system (not shown) that controls the overall operation of the certificate server 300.

The computer processing instructions may also implement a certificate generator 314 that generates the terminal authentication certificates which allow the communications terminals 200 to authenticate to the network gateway 400. The certificate generator 314 also allows the communications terminals 200 to renew their respective terminal authentication certificates. Although the certificate generator 314 may be implemented as computer processing instructions, all or a portion of the functionality of the certificate generator 314 may be implemented instead in electronics hardware.

The certificate generator 314 is configured to receive a terminal activation request from a communications terminal 200, and to determine a validity of the terminal activation request. The terminal activation request includes a digital signature and a public encryption key. The certificate generator 314 determines the validity of the terminal activation request by verifying that the digital signature was generated from a private encryption key that is uniquely associated with the communications terminal 200, and that the public encryption key and the private encryption key comprise an asymmetric encryption key pair.

As discussed above, the terminal management server 350 may include a database of records, each associated with a respective communications terminal 200. Each database record may identify the terminal credentials (e.g. terminal ID, terminal serial number) that are uniquely associated with the communications terminal 200. The terminal activation request may include the terminal credentials of the communications terminal 200. The certificate generator 314 may determine the validity of the terminal activation request by, before (or after) verifying the digital signature on the terminal activation request, using the terminal management server 350 to verify that the terminal credentials included in the terminal activation request are associated with a common communications terminal 200.

The certificate generator 314 is configured to, in accordance with the terminal activation request validity determination, generate an activation response in response to the terminal activation request and transmit the activation response to the communications terminal 200. The activation response comprises a digital authentication certificate that includes the public encryption key and facilitates authentication of the communications terminal 200 to a computer server, distinct from the certificate server 300.

The certificate generator 314 may also be configured to receive from the communications terminal 200 a certificate renewal request requesting renewal of the digital authentication certificate, and to determine a validity of the certificate renewal request. The certificate renewal request may include the public encryption key and a further digital signature. The certificate generator 314 may determine the validity of the certificate renewal request by verifying that the digital signature of the certificate renewal request was generated from the private encryption key that is uniquely associated with the payment terminal and that the public encryption key and the private encryption key comprise an asymmetric encryption key pair.

The certificate generator 314 may be configured to, in accordance with the certificate renewal request validity determination, generate a renewal response in response to the certificate renewal request and transmit the renewal response to the communications terminal 200. The renewal response may include a renewed digital authentication certificate that includes the public encryption key and facilitates authentication of the payment terminal to the computer server. The certificate generator 314 may use the digital authentication certificate (that was included in the activation response) to establish an encrypted connection with the communications terminal 200, and may receive the certificate renewal request from, and transmit the renewal response to, the communications terminal 200 over the encrypted connection.

Network Gateway

The network gateway 400 is implemented as one or more networked computer servers. As shown in FIG. 4, the network gateway 400 includes a primary network interface 402, a secondary network interface 404, and a computer processing unit 406 that is coupled to the primary network interface 402 and the secondary network interface 404. The primary network interface 402 interfaces the network gateway 400 with the first communications network 102 and allows the network gateway 400 to communicate with the communications terminals 200. The secondary network interface 404 interfaces the network gateway 400 with the second communications network 104 and allows the network gateway 400 to communicate with network devices 500 of the second communications network 104.

The computer processing unit 406 may include a microprocessor 408 and a computer-readable medium 410. The computer-readable medium 410 may be provided as electronic computer memory (e.g. flash memory) or optical or magnetic memory (e.g. compact disc, hard disk) and may include computer processing instructions stored thereon which, when executed by the microprocessor 408, define an operating system (not shown) that controls the overall operation of the network gateway 400.

The computer processing instructions may also implement a gateway authenticator 414 that is configured to receive an authentication request from a communications terminal 200, and to transmit the authentication request to a communications network. The authentication request typically includes a token cryptogram that is generated by an identity token 210 that is interfaced with the communications terminal 200.

The gateway authenticator 414 is also configured to save an authentication response that the network gateway 400 receives from the communications network in response to the authentication request. The authentication response includes a gateway authentication certificate which the network gateway 400 uses to authenticate to a network device of the communications network.

In the embodiment described below, the network gateway 400 transmits the authentication request to, and receives the authentication response from the second communications network 104, and uses the gateway authentication certificate to authenticate to a network device 500 of the second communications network 104. However, this configuration is not essential; the network gateway 400 may transmit the authentication request to any network device that can issue a gateway authentication certificate which the network gateway 400 may require to access a particular network.

Terminal Authentication Processing—Overview

Figure 5:
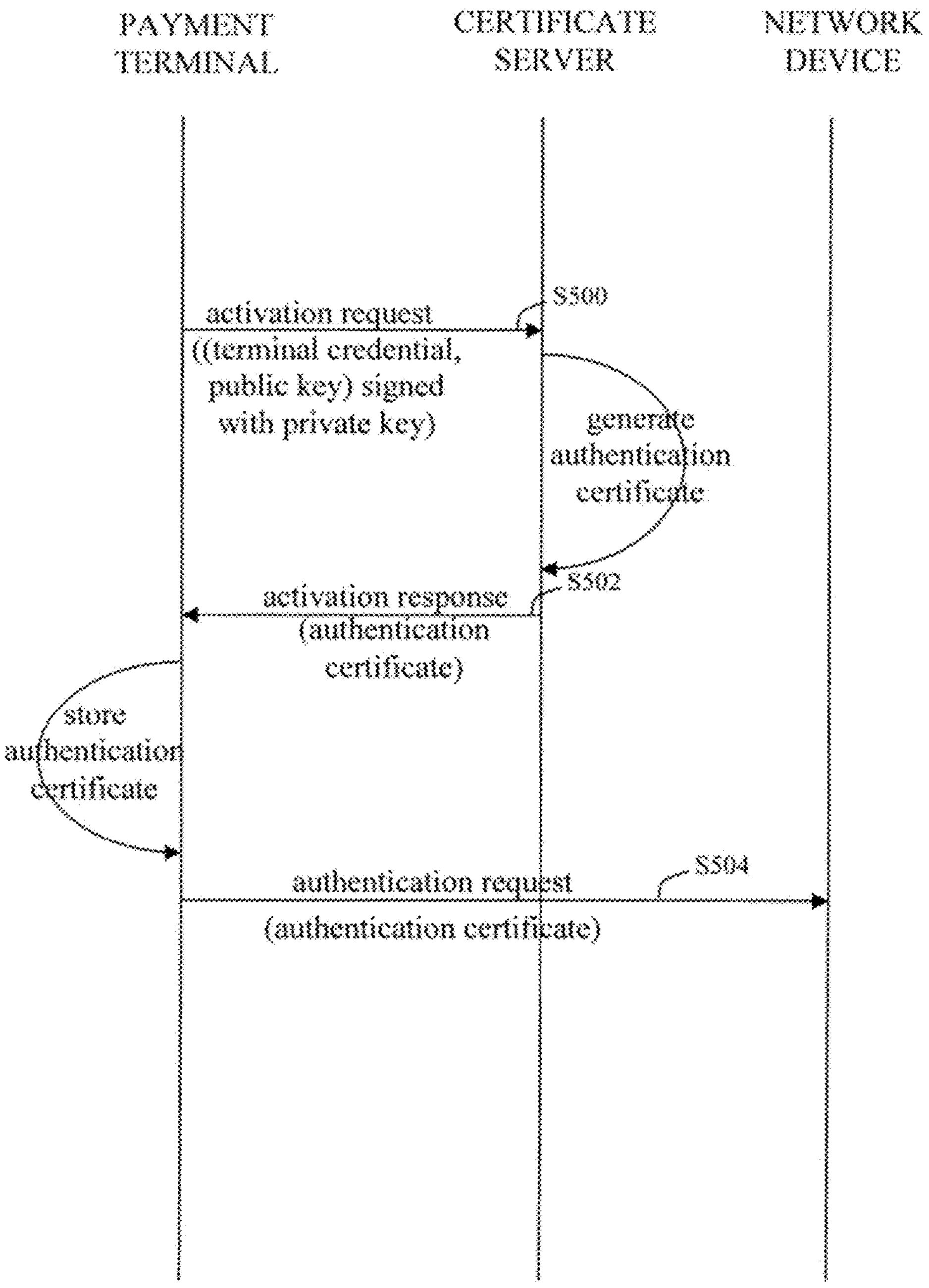
FIG. 5 is a message flow diagram that depicts, by way of overview, the communications terminal authenticating method implemented by the authentication network.

As discussed, the communications terminal 200 implements a method of authenticating the communications terminals 200. A sample embodiment of the communications terminal authenticating method is depicted in FIG. 5. In this embodiment, preferably the communications terminal 200 is implemented as a payment terminal.

At the outset of the method, the payment terminal 200 generates a terminal activation request from a private encryption key (activation code) that is input into or saved in the payment terminal 200, and from at least one terminal credential that is uniquely associated with the payment terminal 200. The terminal activation request includes a public encryption key. Preferably, the public encryption key and the private encryption key comprise an asymmetric encryption key pair. The payment terminal 200 transmits the terminal activation request to the certificate server 300, at step S500.

At step S502, the payment terminal 200 receives an activation response from the certificate server 300 in response to the terminal activation request. The activation response comprises a digital authentication certificate that includes the public encryption key that was included with the terminal activation request.

Preferably, the certificate server 300 signs the digital authentication certificate using the certificate server's private encryption key. The certificate server 300 may determine the validity of the terminal credential, and may generate the digital authentication certificate after successfully validating the terminal credential. Alternately, the certificate server 300 may forward the activation request to a certificate signing authority for generation of the digital authentication certificate (preferably after the certificate server 300 validates the terminal credential), or may generate the digital authentication certificate after forwarding the activation request to another network device for credential validation.

At step S504, the payment terminal 200 uses the digital authentication certificate to authenticate to a network device that is distinct from the certificate server 300. As discussed above, typically the payment terminal 200 uses the digital authentication certificate to authenticate to the network gateway 400. However, the digital authentication certificate may be used to authenticate to any network device that is accessible, directly or indirectly, to the payment terminal 200. Since conventional payment terminal authentication techniques only use the terminal serial number to authenticate the payment terminal, this solution offers a significant advantage over the state of the art.

Gateway Authentication Processing—Overview

Figure 6:
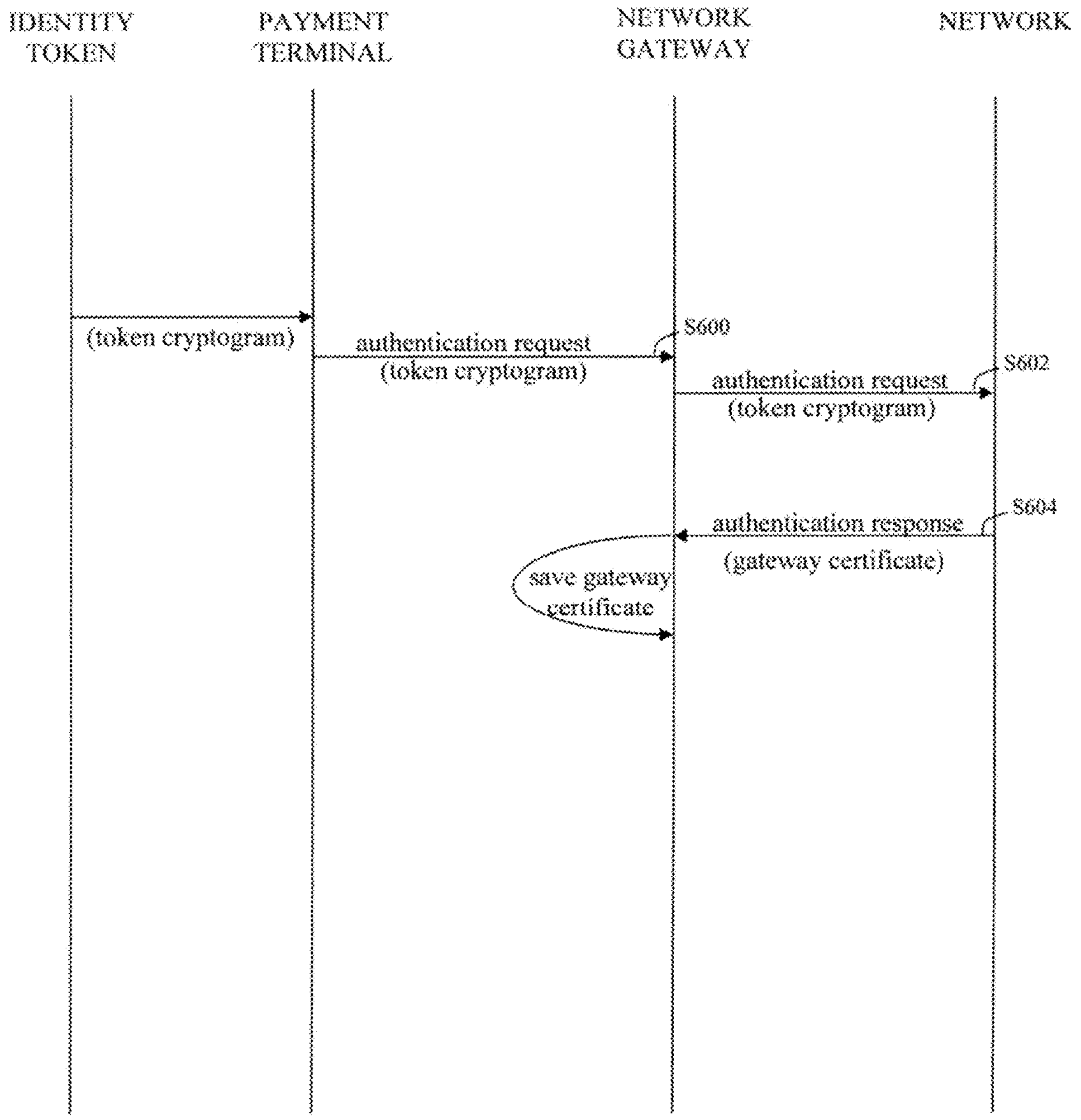
FIG. 6 is a message flow diagram that depicts, by way of overview, the network gateway authenticating method implemented by the authentication network.

As discussed, the network gateway 400 implements a method of network gateway authenticating. A sample embodiment of the network gateway authenticating method is depicted in FIG. 6.

As shown therein, at step S600 the network gateway 400 receives an authentication request from a communications terminal 200. In this embodiment, the communications terminal 200 comprises a wireless or wired communications device, which could be, but is not necessarily, implemented as a payment terminal. The authentication request includes a token cryptogram that is generated by an identity token 210 that is interfaced with the communications terminal 200. Optionally, the authentication request may include one or more of the administrator credentials.

At step S602, the network gateway 400 transmits the authentication request to a communications network. At step S604, the network gateway 400 receives an authentication response from the communications network in response to the authentication request, and saves the authentication response. The authentication response includes a gateway authentication certificate which the network gateway 400 uses to authenticate to a network device of the communications network.

A network device of the communications network may determine the validity of the authentication request (for example, by verifying that the token cryptogram was generated by the identity token 210), and the authentication response may be transmitted to the network gateway 400 in accordance with the determined validity of the authentication request.

Where the authentication request includes an administrator credential, optionally the network gateway 400 may associate the administrator credential with the gateway authentication certificate. Thereafter, if the network gateway 400 receives an administrator credential from the communications terminal 200, the network gateway 400 may use the received administrator credential and the associated gateway authentication certificate to authenticate to the network device of the communications network.

For example, as discussed above with reference to step S506, the communications terminal 200 may receive a terminal authentication certificate that is configured to facilitate authentication of the communications terminal 200 to the network gateway 400. After step S604, the operator of the communications terminal 200 may transmit a validation request to the network gateway 400 requesting authentication of the communications terminal 200 to a network device of the communications network (e.g. the network device 500 of the second communications network 104). The network gateway 400 may facilitate authentication of the communications terminal 200 to the network device of the communications network via the gateway authentication certificate and the validation request.

As a more detailed example, the validation request may include an administrator credential, and the communications terminal 200 may transmit the validation request to the network gateway 400 after using the terminal authentication certificate to authenticate to the network gateway 400. The network gateway 400 may use the validation request to locate the gateway authentication certificate that is associated with the administrator credential, and then use the located gateway authentication certificate to authenticate to the network device of the communications network.

Transaction Processing—Overview

Figure 7:
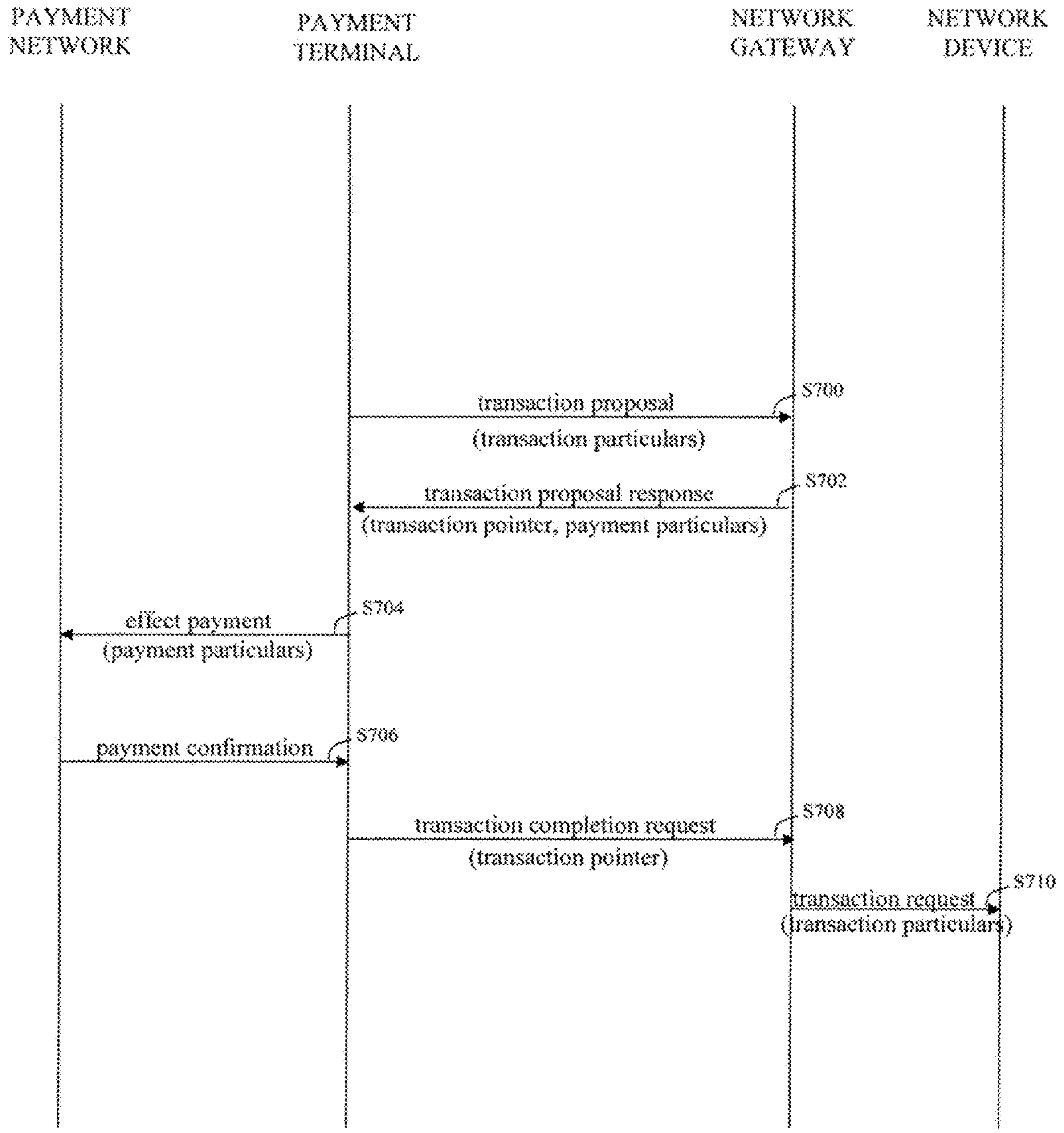
FIG. 7 is a message flow diagram that depicts, by way of overview, the transaction completion method implemented by the authentication network.

As discussed, the network gateway 400 also implements a method for completing a transaction with a network device. A sample embodiment of the transaction completion method is depicted in FIG. 7.

As shown therein, at step S700 the communications terminal 200 transmits a transaction proposal to the network gateway 400 via the first communications network 102. In this embodiment, the communications terminal 200 comprises a wireless or wired communications device, which could be, but is not necessarily, implemented as a payment terminal. The transaction proposal identifies a transaction that the operator of the communications terminal 200 proposes to engage in with a network device.

The network gateway 400 is configured to authenticate to the network device via a communications network that comprises the network device. For example, as discussed above, at step S604 the network gateway 400 may receive a gateway authentication certificate which the network gateway 400 can use to authenticate to a network device of the communications network. Accordingly, the transaction proposal may identify a proposed transaction with the network device 500 of the second communications network 104.

At step S702, the communications terminal 200 receives from the network gateway 400 a transaction proposal response in response to the transaction proposal. The transaction proposal response specifies a pointer to the proposed transaction. Preferably, the transaction proposal response also identifies the payment particulars for the proposed transaction.

At step S704, the communications terminal 200 may transmit over the payment network 106 payment particulars for effecting payment for the proposed transaction. At step S706, the communications terminal 200 may receive from the payment network 106 a payment confirmation in response to the payment particulars. However, these latter two steps are not essential; the operator of the communications terminal 200 may effect payment for the proposed transaction without engaging the payment network 106. For example, the operator may pay cash for the proposed transaction, or may use a payment terminal other than the communications terminal 200 to effect payment for the proposed transaction.

After payment is provided for the proposed transaction, at step S708 the communications terminal 200 initiates completion of the proposed transaction by generating a transaction completion request and transmitting the transaction completion request to the network device via the network gateway 400. The communications terminal 200 generates the transaction completion request from the transaction pointer that was received at step S702. By virtue of the transaction completion request, the communications terminal 200 requests completion of the proposed transaction with the network device.

To complete the transaction, the network gateway 400 may generate a transaction request from the transaction completion request, and transmit the transaction request to the network device via the second communications network 104, at step S710. The transaction request may include the administrator credential and identify the particulars of the proposed transaction.

Online Transaction Processing Method—Detailed Discussion

A preferred implementation of the authentication network 100 will now be discussed with reference to FIGS. 8 to 12. In this implementation, the second communications network 104 comprises a wide area network, such as the Internet, and the network device 500 is implemented as computer (lottery) server that facilitates online lottery ticket sales via the second communications network 104. Each communications terminal 200 is configured as a payment terminal that is connected to a respective electronic cash register (ECR) and is deployed in a respective checkout lane of the merchant's store. The secure payment network 106 comprises the merchants' respective acquirer networks, and customers in the merchants' stores use the communications terminals 200 to purchase lottery tickets from the lottery server 500. Although in the following example method, the communications terminals 200 are used to purchase lottery tickets, it should be understood that the method could be used to complete online transactions other than lottery ticket sales, including the purchase of goods/services, bill payment, funds transfer, and/or bank account or credit card balance query. Further, although in the following example method, the communications terminals 200 are implemented as payment terminals, it should be understood that the communications terminals 200 could be implemented as communications devices other than a payment terminals.

The operator of the lottery provides each merchant with a smartcard 210 that is configured with the unique administrator credentials (sysID and administrator passcode). The lottery server 500 is in communication with a token database that saves the administrator credentials and public cryptographic key associated with each smartcard 210.

The administrator of the terminal management server 350 provides each merchant with a physical document that specifies the terminal credentials (unique terminal ID and terminal serial number) and activation code for each of the merchant's payment terminals 200. The database of the terminal management server 350 stores the terminal credentials of each payment terminal 200. The memory 214 of each payment terminal 200 is pre-configured with a terminal serial number and with the authentication certificate of the certificate server 300.

1. Terminal Activation

Figure 8:
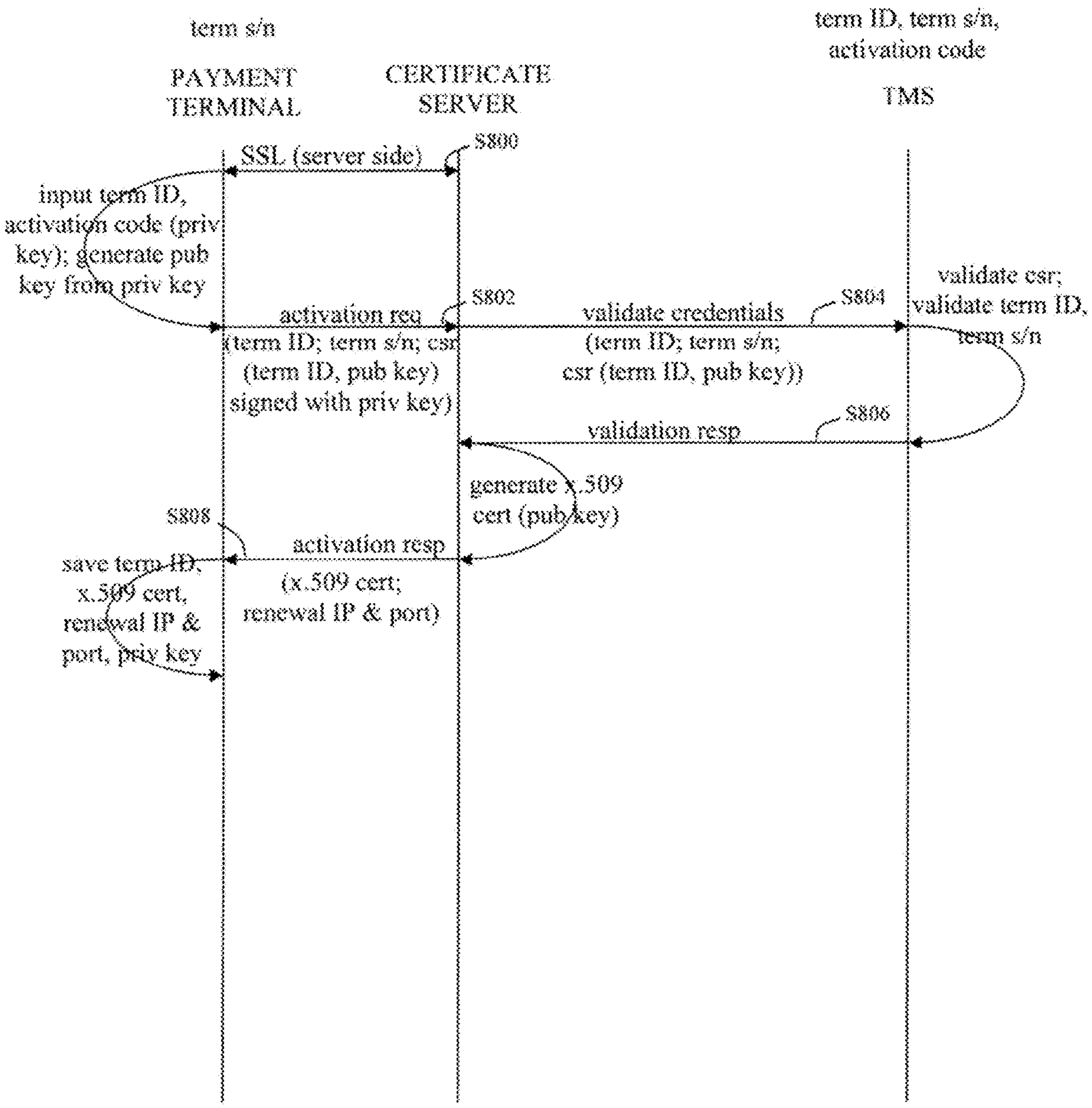
FIG. 8 is a is a detailed message flow diagram that depicts a sample embodiment of the terminal activation method implemented by the authentication network.
Figure 9:
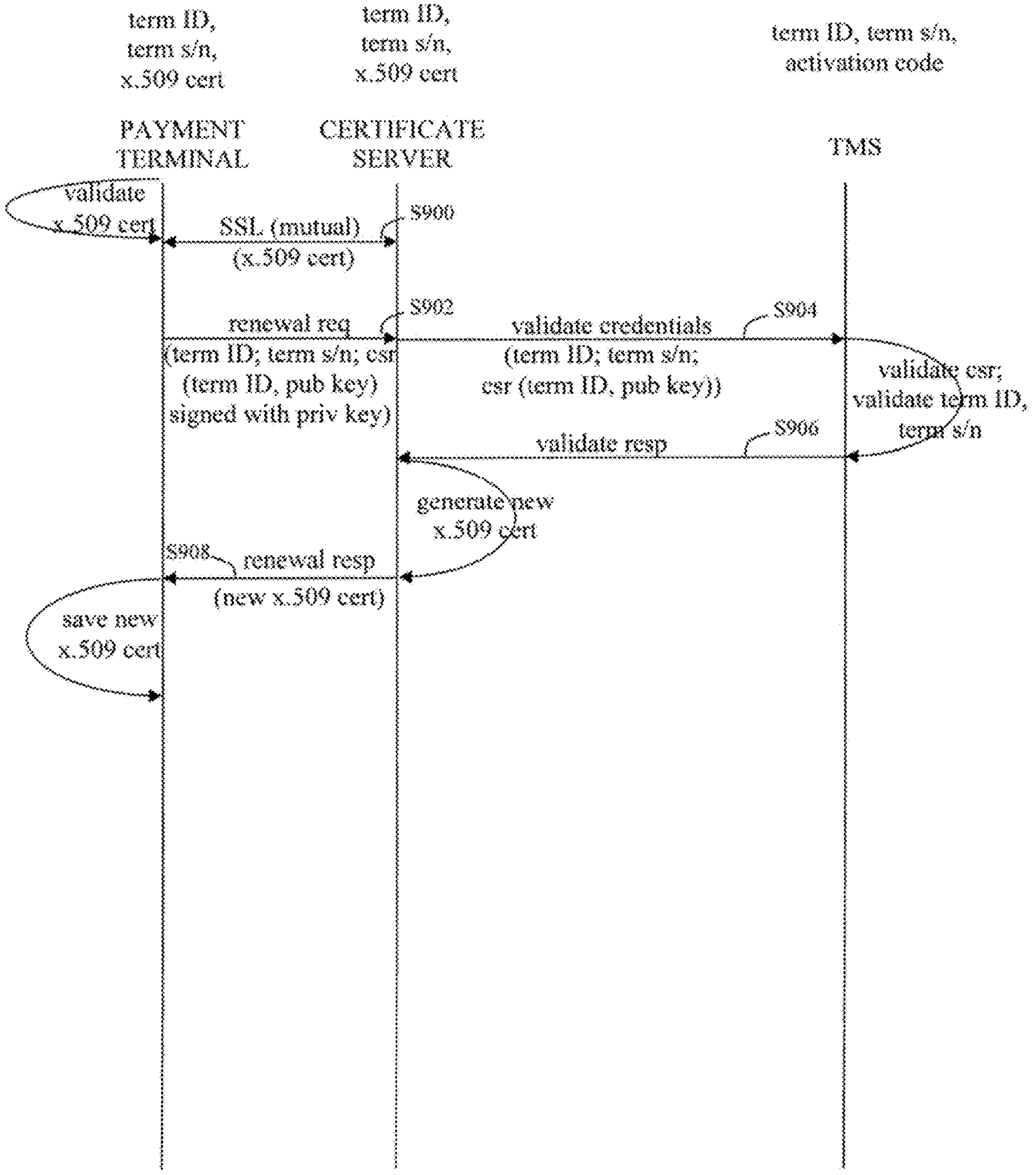
FIG. 9 is a detailed message flow diagram that depicts a sample embodiment of the certificate renewal method implemented by the authentication network.

To allow the merchant to use the payment terminals 200 within the authentication network 100, the merchant executes the terminal activation method, depicted in FIG. 8, to thereby provide each payment terminal 200 with a respective terminal authentication certificate that the payment terminal 200 can use to authenticate to the network gateway 400.

At step S800, the merchant applies power to the payment terminal 200 (by connecting the payment terminal 200 to the associated electronic cash register, for example), and the payment terminal 200 establishes an encrypted channel with the certificate server 300. Typically, the payment terminal 200 uses the authentication certificate of the certificate server 300 to establish a server-side SSL connection with the certificate server 300.

The merchant may use the data input device 202 to select the terminal activation method from a menu of available methods. The terminal authentication processor 218 of the payment terminal 200 then prompts the merchant to input into the payment terminal 200 the activation code (private cryptographic key) and the terminal credentials that identify the payment terminal 200 (terminal ID, terminal serial number). The merchant manually inputs the required terminal credentials into the payment terminal 200 via the data input device 202.

In response, the terminal authentication processor 218 generates a terminal activation request message from the terminal credentials and the activation code. The terminal activation request message includes a public cryptographic key which the terminal authentication processor 218 generates from the activation code. The public cryptographic key and the activation code comprise an asymmetric encryption key pair.

Preferably, the terminal activation request comprises a certificate signing request (CSR) that the terminal authentication processor 218 generates from the terminal credentials. More preferably, the certificate signing request includes the terminal ID and the public cryptographic key and is digitally-signed using the activation code. The terminal activation request may also include an encrypted message authentication code (e.g. HMAC) that is generated from the terminal serial number and the certificate signing request.

At step S802, the payment terminal 200 transmits the terminal activation request to the certificate server 300. The certificate server 300 then determines the validity of the terminal activation request. To do so, at step S804 the certificate generator 314 may transmit the terminal activation request to the terminal management server 350, requesting that the terminal management server 350 validate the terminal credentials included in the terminal activation request. In response, the terminal management server 350 may query its database with the terminal credentials to verify that the terminal credentials are associated with a common payment terminal 200 (i.e. the terminal credentials are associated with a legitimate payment terminal 200). The terminal management server 350 may respond to the certificate server 300 with a validation response, at step S806.

The certificate server 300 may also determine the validity of the terminal activation request by verifying the digital signature on the terminal activation request. To do so, the certificate generator 314 uses the public cryptographic key that was included with the certificate signing request to verify that the certificate signing request was signed using the activation code (and, therefore, verify that the public cryptographic key was generated from the activation code, and the activation code and public cryptographic key comprise an asymmetric encryption key pair).

If the certificate server 300 determines that the terminal activation request is valid, the certificate generator 314 generates an activation response message that includes a terminal authentication certificate that the payment terminal 200 can use to authenticate to the network gateway 400. The certificate generator 314 generates the terminal authentication certificate from the public cryptographic key of the certificate signing request, and signs the terminal authentication certificate with the private encryption key assigned to the certificate server 300. Preferably, the terminal authentication certificate is a X.509 digital certificate and, therefore, specifies an expiry date that is a predetermined number of days after the current date. The certificate generator 314 may insert, into the activation response message, the (renewal) network address (e.g. IP address and/or port number) of the certificate server 300 at which the payment terminal 200 can transmit certificate renewal requests. Otherwise, the certificate server 300 generates an activation response message that indicates that the terminal activation request is invalid.

The certificate server 300 transmits the activation response message to the payment terminal 200, in response to the activation request message, at step S808. In response, the terminal authentication processor 218 may verify that the terminal authentication certificate was digitally-signed by the certificate server 300, and then save the terminal authentication certificate in the memory 214, together with the terminal ID, the activation code, and the renewal network address. Thereafter, the payment terminal 200 may use the terminal authentication certificate to authenticate to the network gateway 400.

2. Terminal Certificate Renewal

As will become apparent, the payment terminals 200 should authenticate to the network gateway 400 whenever customers attempt to use the payment terminals 200 to purchase lottery tickets from the lottery server 500. The payment terminals 200 should also authenticate to the network gateway 400 in order to set up the network gateway 400 and, optionally, to register the payment terminals 200 with the lottery server 500. Therefore, preferably the payment terminal 200 periodically executes the certificate renewal method, depicted in FIG. 9, to determine the validity of the terminal authentication certificate and thereby ensure that the terminal authentication certificate remains valid. As will become apparent, the payment terminal 200 may use the digital authentication certificate to establish an encrypted connection with the certificate server 300 and/or the network gateway 400 based on the validity of the terminal authentication certificate. Unlike the terminal activation method, the gateway setup method, the terminal registration method and the transaction request method described herein, preferably the payment terminals 200 executes the certificate renewal method automatically (i.e. without being invoked by the merchant) and transparently (i.e. without notification to the merchant).

At the outset of the certificate renewal method, preferably the terminal authentication processor 218 determines the validity of the terminal authentication certificate by determining the expiry date of the certificate. If the expiry date indicates that the terminal authentication certificate has expired, the certificate renewal method terminates and the payment terminal 200 will thereafter not re-attempt to authenticate to or otherwise communicate with the network gateway 400, at least until the merchant re-executes the terminal activation method with a new activation code.

However, if the expiry date indicates that the terminal authentication certificate has not expired, and the expiry date of the terminal authentication certificate falls within a predetermined time frame after the current date, at step S900 the terminal authentication processor 218 establishes an encrypted communications channel with the certificate server 300 at the renewal network address (e.g. IP address and/or port number) specified in the activation response message. Typically, the terminal authentication processor 218 uses the terminal authentication certificate to establish a mutually-authenticated SSL connection with the certificate server 300. The certificate server 300 may refuse the connection if the terminal authentication certificate has expired.

The terminal authentication processor 218 then generates a certificate renewal request message from the terminal credentials and the activation code. Preferably, the certificate renewal request message includes the public cryptographic key and the terminal credentials. More preferably, the certificate renewal request comprises a certificate signing request (CSR) that includes the terminal ID and the public cryptographic key and is digitally-signed using the activation code that was saved in the memory 214.

At step S902, the payment terminal 200 transmits the certificate renewal request to the certificate server 300 over the encrypted channel. The certificate server 300 then determines the validity of the certificate renewal request. To do so, at step S904, the certificate generator 314 may transmit the certificate renewal request to the terminal management server 350, requesting that the terminal management server 350 to validate the terminal credentials included in the certificate renewal request. In response, the terminal management server 350 may query its database with the terminal credentials to verify that the terminal credentials are associated with a common payment terminal 200 (i.e. the terminal credentials are associated with a legitimate payment terminal 200).

As will be discussed below, suspicious or fraudulent activity involving the payment terminal 200 may have been reported to the operator of the terminal management server 350. Accordingly, the terminal management server 350 may also query its database with the terminal credentials to verify that the terminal authentication certificate has not been revoked.

If the terminal management server 350 determines that the terminal credentials are associated with a legitimate payment terminal 200, and that the terminal authentication certificate has not been revoked, the terminal management server 350 responds to the certificate server 300 with a validation response, at step S906, indicating that the terminal credentials were successfully validated. Otherwise, the terminal management server 350 responds to the certificate server 300 with a validation response indicating that validation of the terminal credentials failed.

The certificate server 300 may also determine the validity of the certificate renewal request by verifying the digital signature on the certificate renewal request. To do so, the certificate generator 314 uses the public cryptographic key that was included with the certificate signing request to verify that the certificate signing request was signed using the activation code (and, therefore, verify that the public cryptographic key was generated from the activation code, and the activation code and public cryptographic key comprise an asymmetric encryption key pair).

If the certificate server 300 determines that the certificate renewal request (and the terminal credentials included therein) are valid, the certificate generator 314 generates a certificate renewal response message that includes a renewed terminal authentication certificate. The certificate generator 314 generates the renewed terminal authentication certificate from the public cryptographic key of the certificate signing request, and signs the terminal authentication certificate with the private encryption key assigned to the certificate server 300. Preferably, the renewed terminal authentication certificate is a X.509 digital certificate and, therefore, specifies an expiry date that is a predetermined number of days after the current date. Otherwise, the certificate server 300 generates a certificate renewal response message that indicates that the certificate renewal request is invalid.

The certificate server 300 transmits the certificate renewal response message to the payment terminal 200, in response to the certificate renewal request, at step S908. In response, preferably the terminal authentication processor 218 determines the validity of the renewed terminal authentication certificate by verifying that the renewed terminal authentication certificate was signed by the certificate server 300, and then replaces the terminal authentication certificate in the memory 214 with the renewed terminal authentication certificate. Thereafter, the payment terminal 200 uses the renewed terminal authentication certificate to authenticate to the network gateway 400. Since the payment terminal 200 preferably verifies that the (renewed) terminal authentication certificate was signed by the certificate server 300 upon receipt of same from the certificate server 300, and periodically determines the expiry date of the (renewed) terminal authentication certificate prior to transmitting a certificate renewal request to the certificate server 300, in effect the payment terminal 200 renews the terminal authentication certificate in accordance with the outcome of the digital signature verification and the expiry date verification.

3. Gateway Setup

Figure 10:
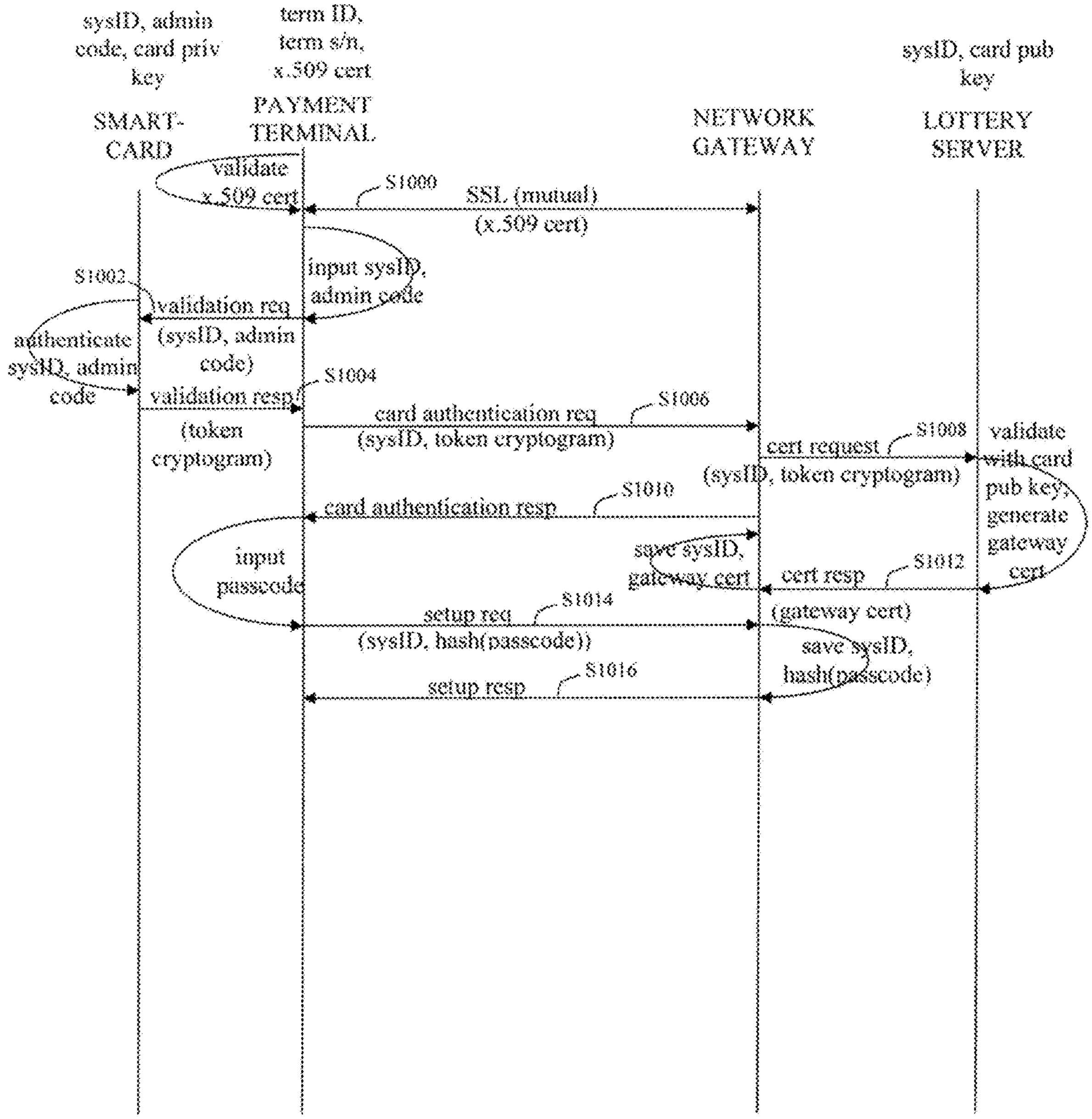
FIG. 10 is a detailed message flow diagram that depicts a sample embodiment of the gateway setup method implemented by the authentication network.

After activating the payment terminal 200, the merchant executes the gateway setup method, depicted in FIG. 10, to thereby provide the network gateway 400 with a gateway authentication certificate that the network gateway 400 can use to authenticate to the lottery server 500 of the second communications network 104. Optionally, the gateway setup method also installs in the network gateway 400 a gateway credential which the payment terminal 200 can use to allow the merchant to access and configure the network gateway 400.

The merchant may use the data input device 202 to select the gateway setup method from the menu of available methods. If the terminal authentication processor 218 determines that the terminal authentication certificate is valid, the terminal authentication processor 218 establishes an encrypted channel with the network gateway 400, at step S1000. Typically, the terminal authentication processor 218 uses the terminal authentication certificate to establish a mutually-authenticated SSL connection with the network gateway 400. The network gateway 400 may refuse the connection if the terminal authentication certificate has expired.

The terminal authentication processor 218 of the payment terminal 200 then prompts the merchant to interface an identity token with the payment terminal 200 and to input one or more administrator credentials (e.g. sysID, administrator passcode) into the payment terminal 200. The merchant interfaces the supplied smartcard 210 with the token interface 209 of the payment terminal 200, and then uses the data input device 202 to input the required administrator credentials into the payment terminal 200. In response, the terminal authentication processor 218 generates a credential validation request message that includes the administrator credential(s). The terminal authentication processor 218 transmits the credential validation request to the smartcard 210, at step S1002.

In response, the smartcard 210 may compare the administrator credentials that were received in the credential validation request with the administrator credentials that are saved in the protected memory of the smartcard 210. If the received administrator credentials match the saved administrator credentials, the smartcard 210 may generate a token cryptogram from the administrator credentials and the private cryptographic key saved in the smartcard 210. Alternately, the smartcard 210 may generate the token cryptogram without comparing the administrator credentials with the saved administrator credentials.

The smartcard 210 then generates a credential validation response that includes the token cryptogram. Otherwise, the smartcard 210 may generate a credential validation response that indicates that the received administrator credentials are invalid. The smartcard 210 transmits the credential validation response to the payment terminal 200, in response to the credential validation request, at step S1004.

If the credential validation response includes a token cryptogram, the terminal authentication processor 218 generates a card authentication request message that includes the administrator credentials and the token cryptogram. The terminal authentication processor 218 then transmits the card authentication request to the network gateway 400 over the encrypted channel, at step S1006. Preferably, the smartcard 210 generates the token cryptogram from the administrator sysID and the token private cryptographic key and, therefore, the card authentication request includes the administrator sysID and the token cryptogram.

The gateway authenticator 414 of the network gateway 400 generates a certificate request message that includes the token cryptogram and associated administrator credential(s), and transmits the certificate request message to a network device (lottery server) 500 of the second communications network, at step S1008. In response, the lottery server uses the administrator credential(s) of the certificate request message to locate the public cryptographic key that is associated with the smartcard 210. The lottery server then validates the token cryptogram of the certificate request message using the located public cryptographic key, thereby verifying that the token cryptogram was generated from the administrator credentials and from the private cryptographic key that are associated with the smartcard 210.

If the lottery server determines that the token cryptogram is valid, the lottery server generates a certificate response message that includes a gateway authentication certificate that the network gateway 400 can use to authenticate to the lottery server. The lottery server signs the gateway authentication certificate with the private encryption key assigned to the lottery server, and may also associate the gateway authentication certificate with the administrator credential(s) that were included with the certificate request message. Otherwise, the lottery server generates a certificate response message that indicates that the token cryptogram is invalid. The lottery server transmits the certificate response message to the network gateway 400, in response to the certificate request message, at step S1010.

The gateway authenticator 414 may verify that the gateway authentication certificate was digitally-signed by the lottery server, and then saves the gateway authentication certificate, together with the administrator credentials that were included in the card validation request. Preferably, the gateway authenticator 414 associates the gateway authentication certificate with the administrator sysID. Thereafter, the network gateway 400 can use the gateway authentication certificate to authenticate to the lottery server.

The gateway authenticator 414 then generates a card authentication response, indicative of the validity of the token cryptogram. The gateway authenticator 414 transmits the card validation response to the payment terminal 200, in response to the card authentication request, at step S1012.

Optionally, the terminal authentication processor 218 of the payment terminal 200 may then prompt the merchant to input into the payment terminal 200 a new credential (e.g. a gateway passcode) which the merchant would like to use to access and configure the network gateway 400. The merchant uses the data input device 202 to input the new credential (gateway passcode) into the payment terminal 200. In response, the terminal authentication processor 218 computes a hash code from the gateway passcode, and generates a security setup request message that includes the administrator sysID and hashed gateway passcode. The terminal authentication processor 218 transmits the security setup request to the network gateway 400, at step S1014.

The gateway authenticator 414 validates the security setup request by verifying that the network gateway 400 has already associated the administrator sysID (included in the security setup request message) with a gateway authentication certificate. If the gateway authenticator 414 is able to locate a corresponding gateway authentication certificate, the gateway authenticator 414 associates the hashed gateway passcode with the saved administrator sysID and the associated gateway authentication certificate, and generates a security setup response message, indicative of the validity of the administrator sysID. Otherwise, the gateway authenticator 414 generates a security setup response message that indicates that the security setup request failed.

The gateway authenticator 414 transmits the security setup response message to the payment terminal 200, in response to the security setup request, at step S1016. If the security setup request was successfully validated, the merchant may thereafter use the administrator sysID and associated gateway passcode to access and configure the network gateway 400, as will be explained in the next section.

4. Terminal Validation—Optional

Figure 11:
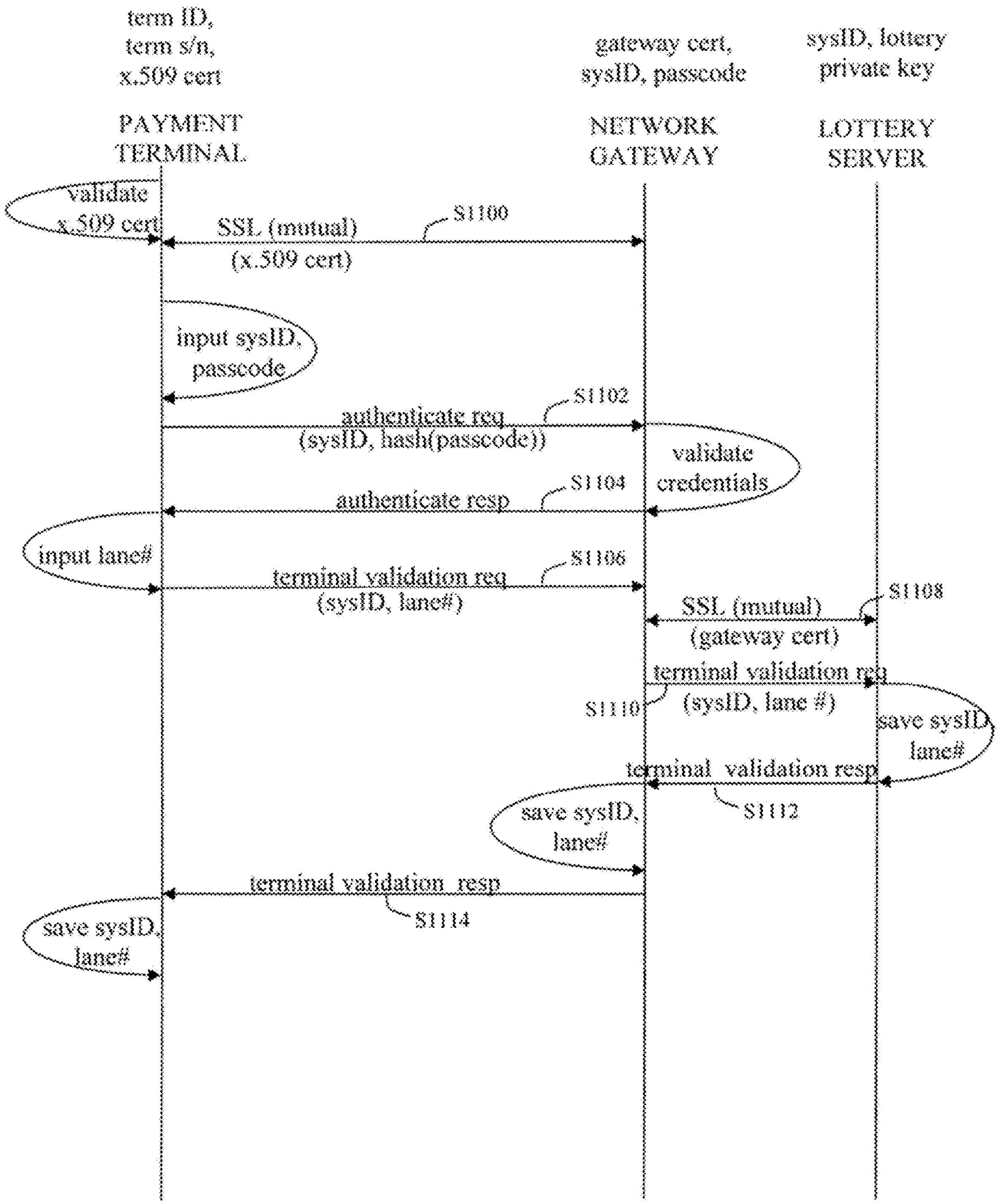
FIG. 11 is a detailed message flow diagram that depicts a sample embodiment of the terminal validation method implemented by the authentication network.

The merchant may optionally execute the terminal validation method, depicted in FIG. 11, which registers the payment terminals 200 with the lottery server. Registering the payment terminals 200 allows the lottery server to subsequently verify the validity of the payment terminal 200.

The merchant may use the data input device 202 to select the terminal validation method from the menu of available methods. If the terminal authentication processor 218 determines that the terminal authentication certificate is valid, the terminal authentication processor 218 establishes an encrypted channel with the network gateway 400, at step S1100. Typically, the terminal authentication processor 218 uses the terminal authentication certificate to establish a mutually-authenticated SSL connection with the network gateway 400. The network gateway 400 may refuse the connection if the terminal authentication certificate has expired.

The terminal authentication processor 218 of the payment terminal 200 then prompts the merchant to an input one or more credentials (e.g. administrator sysID and gateway passcode) into the payment terminal 200. The merchant uses the data input device 202 to input the requested credentials into the payment terminal 200. In response, the terminal authentication processor 218 computes a hash code from the gateway passcode, and generates an administrator authentication request message that includes the administrator sysID and hashed gateway passcode. The terminal authentication processor 218 transmits the administrator authentication request to the network gateway 400 over the encrypted channel, at step S1102.

The gateway authenticator 414 validates the administrator authentication request by verifying that the network gateway 400 has already associated the administrator sysID and hashed gateway passcode with a gateway authentication certificate. If the gateway authenticator 414 is able to locate a corresponding gateway authentication certificate, the gateway authenticator 414 generates an administrator authentication response message, indicative of the validity of the credentials. Otherwise, the gateway authenticator 414 generates an administrator authentication response message that indicates that the administrator authentication request failed.

If the administrator authentication request was successfully validated, the terminal authentication processor 218 prompts the merchant to input into the payment terminal 200 a "local terminal credential" which the merchant would like to use to identify this particular payment terminal 200. As used herein, a "local terminal credential" is a terminal credential that a merchant may use to uniquely identify one of the merchant's payment terminals but which, in contrast to other terminal credentials (e.g. terminal serial numbers), are not necessarily unique amongst all merchants of the network gateway 400.

As discussed above, each payment terminal 200 may be deployed in a respective checkout lane of the merchant's store. Accordingly, the merchant may use the data input device 202 to input the lane number (local terminal credential) into the payment terminal 200. In response, the terminal authentication processor 218 generates a terminal validation request message that includes the administrator sysID and lane number. The terminal authentication processor 218 transmits the terminal validation request to the network gateway 400 over the encrypted channel, at step S1104.

The gateway authenticator 414 uses the administrator sysID (included in the terminal validation request message) to locate the corresponding gateway authentication certificate. If the gateway authenticator 414 is able to locate the corresponding gateway authentication certificate, the gateway authenticator 414 uses the located gateway authentication certificate to establish an encrypted communications channel with the lottery server via the second communications network 104, at step S1108. Typically, the gateway authenticator 414 uses the located gateway authentication certificate to establish a mutually-authenticated SSL connection with the lottery server. Otherwise, the gateway authenticator 414 generates a terminal validation response message that indicates that the terminal validation request failed.

If the gateway authenticator 414 is able to validate the terminal validation request, at step S1110 the gateway authenticator 414 transmits the terminal validation request to the lottery server over the encrypted channel that is established between the network gateway 400 and the lottery server. The lottery server may validate the terminal validation request by verifying that the lottery server has already associated the administrator sysID with the gateway authentication certificate (e.g. after step S1008 of the gateway setup method).

If the lottery server is able to validate the terminal validation request, the lottery server associates the administrator sysID with the specified lane number, and then generates a terminal validation response message, confirming successful validation of the terminal validation request. Otherwise, the lottery server generates a terminal validation response message that indicates that the a terminal validation request failed. The lottery server transmits the terminal validation response message to the network gateway 400, at step S1112.

If the terminal validation request is successful, the gateway authenticator 414 associates the administrator sysID with the specified lane number. The gateway authenticator 414 then transmits the terminal validation response message to the payment terminal 200, in response to the terminal validation request, at step S1114. If the terminal validation request was successfully validated, the payment terminal 200 saves the specified lane number in the memory 214, together with the administrator sysID.

The merchant typically executes the terminal validation method on each of the merchant's payment terminals 200. Each payment terminal 200 may thereafter use the administrator sysID and the payment terminal's local terminal credential to identify itself to the lottery server. As will be demonstrated in the next section, the administrator sysID and associated local terminal credential allow the lottery server to confirm the validity of the payment terminal 200.

5. Transaction Proposal Processing

Figure 12:
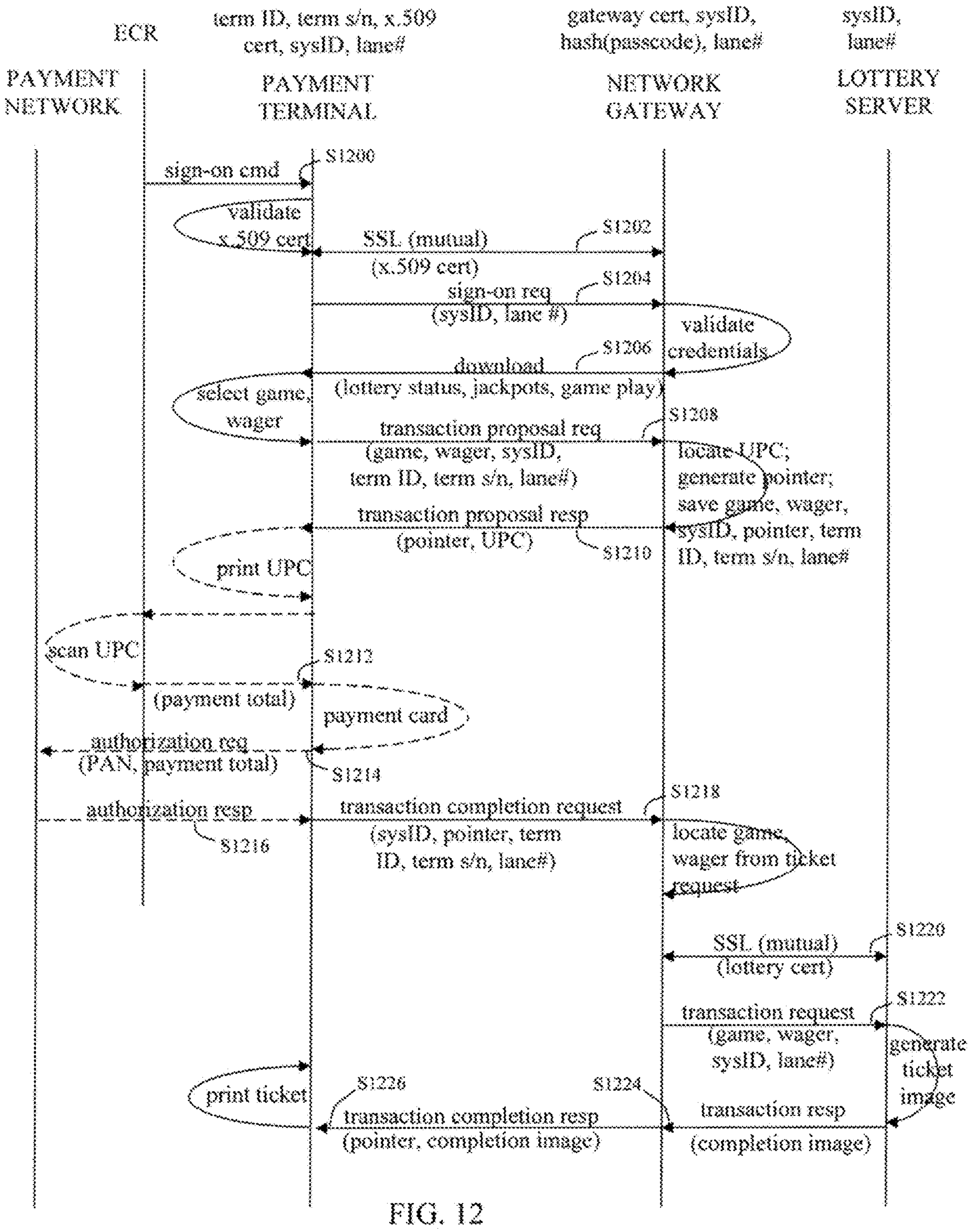
FIG. 12 is a detailed message flow diagram that depicts a sample embodiment of the transaction processing method implemented by the authentication network.

After the merchant has activated the payment terminals 200 and set up the network gateway 400 (and optionally validated the payment terminals 200 to the lottery server), the merchant's customer may execute the transaction processing method, depicted in FIG. 12, to complete an online transaction with a network device (lottery server) 500 of the second communications network 104.

At step S1200, an operator of the electronic cash register transmits a sign-on request message from the electronic cash register to the associated payment terminal 200. If the terminal authentication processor 218 determines that the terminal authentication certificate is valid, the terminal authentication processor 218 establishes an encrypted channel with the network gateway 400, at step S1202. Typically, the terminal authentication processor 218 uses the terminal authentication certificate to establish a mutually-authenticated SSL connection with the network gateway 400. The network gateway 400 may refuse the connection if the terminal authentication certificate has expired.

The transaction processor 220 then generates a sign-on authentication request message that includes one or more the administrator credentials which the transaction processor 220 reads from the memory 214 of the payment terminal 200. Preferably, the sign-on authentication request message includes the administrator sysID and the local terminal credential of the payment terminal 200 (if assigned). The transaction processor 220 transmits the sign-on authentication request message to the network gateway 400 over the encrypted channel, at step S1204.

The gateway authenticator 414 validates the sign-on authentication request by verifying that the network gateway 400 has associated the specified local terminal credential with the specified administrator sysID. The gateway authenticator 414 then generates a sign-on authentication response message, indicative of the validity of the credentials. The gateway authenticator 414 transmits the sign-on authentication response message to the payment terminal 200, in response to the sign-on authentication request, at step S1204.

The network gateway 400 may periodically receive summary lottery information from the lottery server (in response to "ping" messages transmitted by the network gateway 400, for example). The summary lottery information typically includes a list of the various lottery games that are available and, for each available lottery game, the deadline for purchasing lottery tickets and the current jackpot. If the credentials included with the sign-on authentication request are valid, preferably the sign-on authentication response message indicates that the sign-on authentication request was successful, and the gateway authenticator 414 downloads the most recent summary lottery information to the payment terminal 200. Otherwise, the sign-on authentication response message indicates that the sign-on authentication request failed.

If the sign-on authentication response is successful, the transaction processor 220 prompts the customer to select one of the available lottery games and the corresponding wager amount. The customer may use the data input device 202 to select the desired lottery game from the list of available lottery games, and to input the desired wager amount.

The customer proposes a transaction with the lottery server by entering the requested information into the payment terminal 200. From one or more administrator credentials and/or one or more terminal credentials, the transaction processor 220 generates a transaction proposal message that specifies the particulars of the proposed transaction. The transaction proposal message identifies the selected lottery game and wager amount, and preferably also includes one or more administrator credentials and/or one or more terminal credentials which the transaction processor 220 reads from the memory 214 of the payment terminal 200. Preferably, the transaction proposal message includes the administrator sysID, terminal ID, terminal serial number, and lane number. The transaction processor 220 transmits the transaction proposal request to the network gateway 400 over the encrypted connection, at step S1208.

In a previous online transaction, the operator of the lottery server may have detected suspicious or fraudulent activity involving the payment terminal 200, and may have reported said activity to the operator of the terminal management server 350. In response, the operator of the terminal management server 350 may have updated the database of the terminal management server 350 to indicate that the terminal authentication certificate assigned to the payment terminal 200 is revoked. Accordingly, while not shown in FIG. 12, after receiving the transaction proposal request the gateway authenticator 414 may transmit to the terminal management server 350 a certificate status request message that includes the terminal ID and/or terminal serial number and requests that the terminal management server 350 determine whether the terminal authentication certificate that is associated with the specified terminal credentials has been revoked. The terminal management server 350 may respond to the network gateway 400 with a certificate status response message indicating the revocation status of the terminal authentication certificate.

If the terminal authentication certificate has been revoked, the transaction processing method terminates. Otherwise, the gateway authenticator 414 generates a random transaction pointer, and associates the transaction pointer with the transaction proposal message. Preferably, the gateway authenticator 414 generates the transaction pointer from one or more of the selected lottery game, wager amount, administrator sysID, terminal ID, terminal serial number, and lane number. Preferably, however, the elements of the transaction proposal message cannot be determined from the transaction pointer.

The gateway authenticator 414 then generates a transaction proposal response message that includes the transaction pointer and provides an indication of the payment particulars (e.g. payment amount) for the proposed transaction. Preferably, the indication of payment particulars comprises a payment image that is associated with the payment particulars. More preferably, the payment image comprises a bar code (e.g. universal product code) which the gateway authenticator 414 generates from the selected lottery game and wager amount. The gateway authenticator 414 transmits the transaction proposal response message to the payment terminal 200, in response to the transaction proposal, at step S1210.

Upon receipt of the transaction proposal response, the transaction processor 220 saves the transaction pointer in the memory 214, and may render the payment particulars on the display device 204 of the payment terminal 200. The operator of the electronic cash register may then input the payment particulars into the electronic cash register, and transmit the payment particulars from the electronic cash register to the payment terminal 200, at step S1212. If the payment particulars comprise a payment image (e.g. universal product code), the transaction processor 220 may use the printer of the display device 204 to render the payment image. The operator of the electronic cash register may then use the bar code scanner of the electronic cash register to scan the printed payment image and thereby input the payment particulars into the electronic cash register. Alternately, instead of using manual input or scanning of a payment image to input the payment particulars into the electronic cash register, the transaction processor 220 may transmit the payment particulars directly to the electronic cash register.

The customer then provides payment for the proposed transaction. The customer may provide cash payment for the proposed transaction, and the operator of the electronic cash register may use the electronic cash register to provide the transaction processor 220 with a successful payment confirmation message. However, since the customer has used the payment terminal 200 to generate the transaction proposal, preferably the transaction processor 220 invokes the payment processor 216, upon receipt of the payment particulars from the electronic cash register, to thereby allow the customer to provide electronic payment for the proposed transaction via the payment network 106.

To provide electronic payment for the proposed transaction, the customer may interface the customer's payment card with the contact/contactless token interface 209 of the payment terminal 200 to thereby provide the payment processor 216 with the required payment account information (e.g. credit card number, debit account number). The customer may also use the data input device 202 to provide any required customer credentials (e.g. personal identification number). The payment processor 216 may transmit the payment particulars and payment account information over the payment network 106 at step S1214, and provide the transaction processor 220 with a successful payment confirmation message, at step S1216, after receiving confirmation from the payment network 106 that the customer successfully provided payment for the proposed transaction.

Upon receiving a successful payment confirmation message, the transaction processor 220, generates a transaction completion request message that requests completion of the proposed transaction with the lottery server, and includes the transaction pointer. Preferably, the transaction validation request message also includes one or more administrator credentials and/or one or more terminal credentials which the transaction processor 220 reads from the memory 214 of the payment terminal 200. More preferably, the transaction completion request message includes the administrator sysID, terminal ID, terminal serial number, and lane number. If the transaction processor 220 does not receive a successful payment confirmation message from the electronic cash register within a predetermined time period, the transaction processor 220 does not generate a transaction validation request message and instead deletes the transaction pointer from the memory 214 to thereby prevent the customer from completing the proposed transaction with the lottery server.

The transaction processor 220 transmits the transaction completion request to the network gateway 400 over the encrypted channel, at step S1218. In response, the gateway authenticator 414 uses the administrator sysID (included in the transaction completion request) to locate the corresponding gateway authentication certificate, and then uses the located gateway authentication certificate to establish an encrypted communications channel with the lottery server via the second communications network 104, at step S1220. Typically, the gateway authenticator 414 uses the gateway authentication certificate to establish a mutually-authenticated SSL connection with the lottery server.

The gateway authenticator 414 also uses the transaction completion request to locate the previously-selected lottery game and wager amount, and generates a transaction request message that specifies the selected lottery game and wager amount. Preferably, the transaction request message also includes one or more administrator credentials and/or one or more terminal credentials from the transaction completion request. More preferably, the transaction request message includes the administrator sysID and lane number. At step S1222, the gateway authenticator 414 transmits the transaction request message to the lottery server over the encrypted channel that is established between the network gateway 400 and the lottery server.

The lottery server may validate the transaction request by verifying that the lottery server has already associated the administrator sysID and lane number with the gateway authentication certificate (e.g. after step S1110 of the terminal registration method). If the lottery server is able to validate the transaction request, preferably the lottery server generates a transaction response message that includes a transaction completion image that provides confirmation of completion of the proposed transaction. More preferably, the lottery server randomly generates any/all game numbers/indicia that are required for the selected lottery game, and the transaction completion image comprises a lottery ticket image that depicts the generated game numbers/indicia. Otherwise, the lottery server generates a transaction response message that indicates that the transaction request could not be validated.

The lottery server downloads the transaction response message to the network gateway 400, in response to the transaction request message, at step S1224. The gateway authenticator 414 generates a transaction completion response message from the transaction response message. If the transaction request was successfully validated, preferably the transaction completion response message includes the transaction pointer and the transaction completion image. The gateway authenticator 414 downloads the transaction completion response message to the payment terminal 200, in response to the transaction completion request, at step S1226.

If the transaction completion request was successfully validated, the transaction processor 220 deletes the transaction pointer from the memory 214, and prints the transaction completion image that was included with the transaction completion response.

The invention claimed is:

1. A terminal configuration network comprising:

a communications terminal configured to generate an activation request, wherein the activation request includes at least one terminal credential;

a certificate server, and a computer server, wherein the certificate server is configured to:

receive the activation request from the communications terminal, validate the activation request by confirming that the at least one terminal credential was uniquely associated with the communications terminal in a credential database prior to the certificate server receiving the activation request, wherein the credential database is remote from the communications terminal, generate an activation response in response to the validating the activation request, the activation response including a digital certificate, and transmit the activation response to the communications terminal;

wherein the communications terminal is configured to:

establish an encrypted channel with the computer server using the digital certificate and transmit a card authentication request to the computer server via the encrypted channel, the card authentication request including an administrator credential and a cryptogram, the computer server being distinct from the certificate server; and wherein the computer server is configured to:

locate, using the administrator credential, a public cryptographic key associated with the administrator credential in a token database, and confirm using the located public cryptographic key that the cryptogram was generated from the administrator credential and from a private cryptographic key, wherein the public cryptographic key and the private cryptographic key are an asymmetric cryptographic key pair; and download a payload to the communications terminal via the encrypted channel.

2. The terminal configuration network according to claim 1, wherein:

the communications terminal includes a user input device and a non-volatile memory;

the non-volatile memory stores one of the at least one terminal credentials;

the communications terminal is configured to receive another of the at least one terminal credentials via the user input device, and incorporate the one terminal credential and the another terminal credential into the activation request; and the certificate server is configured to validate the activation request by confirming that the one terminal credential was saved uniquely in association with the another terminal credential in the credential database prior to the certificate server receiving the activation request.

3. The terminal configuration network according to claim 2, wherein the communications terminal is configured to sign the activation request with an activation code, and the certificate server is configured to validate the activation request by confirming that the activation request was signed with the activation code.

4. The terminal configuration network according to claim 3, wherein the communications terminal is configured to receive the activation code via the user input device, generate a public cryptographic key from the activation code, and incorporate the public cryptographic key into the activation request, and the certificate server is configured to use the public cryptographic key to confirm that the activation request was signed with the activation code, wherein the public cryptographic key and the activation code are an asymmetric cryptographic key pair.

5. The terminal configuration network according to claim 1, wherein the digital certificate includes an expiry date, and the communications terminal is configured to determine from the expiry date that the digital certificate has expired, renew the digital certificate, and establish the encrypted channel using the renewed digital certificate.

6. The terminal configuration network according to claim 5, wherein the digital certificate includes a network address, and the communications terminal is configured to renew the digital certificate by generating a renewal request, and transmitting the renewal request to the network address, wherein the renewal request includes the at least one terminal credential.

7. The terminal configuration network according to claim 1, wherein the computer server is configured to download the payload by:

receiving from the communications terminal an authentication request including the administrator credential, confirming that the computer server had associated the administrator credential with the communications terminal prior to the computer server receiving the authentication request, and transmitting the payload to the communications terminal after the computer server confirming the authentication request.

8. A method of configuring a communications terminal, the method comprising:

the communications terminal generating an activation request, and transmitting the activation request to a certificate server, wherein the activation request includes at least one terminal credential;

the certificate server validating the activation request, wherein the validating the activation request comprises the certificate server confirming that the at least one terminal credential was uniquely associated with the communications terminal in a credential database prior to the certificate server receiving the activation request, wherein the credential database is remote from the communications terminal;

the certificate server generating an activation response in response to the validating the activation request, and transmitting the activation response to the communications terminal, wherein the activation response includes a digital certificate;

the communications terminal establishing an encrypted channel with a computer server using the digital certificate and transmitting a card authentication request to the computer server via the encrypted channel, the card authentication request including an administrator credential and a cryptogram, the computer server being distinct from the certificate server;

the computer server locating, using the administrator credential, a public cryptographic key associated with the administrator credential in a token database, and confirming using the located public cryptographic key that the cryptogram was generated from the administrator credential and from a private cryptographic key, wherein the public cryptographic key and the private cryptographic key are an asymmetric cryptographic key pair; and the computer server downloading a payload to the communications terminal via the encrypted channel.

9. The method according to claim 8, wherein:

the communications terminal includes a user input device and a non-volatile memory;

the non-volatile memory stores one of the at least one terminal credentials;

the generating an activation request comprises the communications terminal receiving another of the at least one terminal credentials via the user input device, and incorporating the one terminal credential and the another terminal credential into the activation request; and the validating the activation request comprises the certificate server confirming that the one terminal credential was saved uniquely in association with the another terminal credential in the credential database prior to the certificate server receiving the activation request.

10. The method according to claim 9, wherein the generating an activation request comprises the communications terminal signing the activation request with an activation code, and the validating the activation request comprises the certificate server confirming that the activation request was signed with the activation code.

11. The method according to claim 10, wherein the generating an activation request comprises the communications terminal receiving the activation code via the user input device, generating a public cryptographic key from the activation code, and incorporating the public cryptographic key into the activation request, and the validating the activation request comprises the certificate server using the public cryptographic key to confirm that the activation request was signed with the activation code, wherein the public cryptographic key and the activation code are an asymmetric cryptographic key pair.

12. The method according to claim 8, wherein the digital certificate includes an expiry date, and the establishing an encrypted connection comprises the communications terminal determining from the expiry date that the digital certificate has expired, and renewing the digital certificate.

13. The method according to claim 12, wherein the digital certificate includes a network address, and the renewing the digital certificate comprises the communications terminal generating a renewal request, and transmitting the renewal request to the network address, wherein the renewal request includes the at least one terminal credential.

14. The method according to claim 8, wherein the downloading a payload comprises the computer server:

receiving from the communications terminal an authentication request including the administrator credential, confirming that the computer server had associated the administrator credential with the communications terminal prior to the computer server receiving the authentication request, and transmitting the payload to the communications terminal after the computer server confirming the administrator credential.

* * * * *